US011455634B2

(12) United States Patent
Agrawal et al.

(10) Patent No.: US 11,455,634 B2
(45) Date of Patent: Sep. 27, 2022

(54) PAYMENT TRANSACTION METHODS AND SYSTEMS ENABLING VERIFICATION OF PAYMENT AMOUNT BY FINGERPRINT OF CUSTOMER

(71) Applicant: MASTERCARD INTERNATIONAL INCORPORATED, Purchase, NY (US)

(72) Inventors: Rahul Agrawal, Pune (IN); Sudhir Gupta, Pune (IN); Harsh Piparsaniya, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 26 days.

(21) Appl. No.: 16/437,301

(22) Filed: Jun. 11, 2019

(65) Prior Publication Data
US 2019/0392453 A1 Dec. 26, 2019

(30) Foreign Application Priority Data
Jun. 21, 2018 (SG) .............. 10201805340T

(51) Int. Cl.
*G06Q 20/40* (2012.01)
*G06Q 20/38* (2012.01)
(Continued)

(52) U.S. Cl.
CPC ..... *G06Q 20/40145* (2013.01); *G06Q 20/341* (2013.01); *G06Q 20/382* (2013.01); *G06Q 20/4012* (2013.01); *G06Q 20/20* (2013.01)

(58) Field of Classification Search
CPC ....... H04L 9/3226; H04L 9/3231; H04L 9/32; G06F 21/32; G06F 21/31; G06Q 50/265;
(Continued)

(56) References Cited

U.S. PATENT DOCUMENTS 6,058,288 A 5/2000 Reed et al.
7,828,208 B2 * 11/2010 Gangi ................. G06Q 20/204
235/380
(Continued)

OTHER PUBLICATIONS

Andolf-Orup, Lina. "Biometric Payment Cards—Where are we Now?" Fingerprints.com <https://www.fingerprints.com/2018/01/30/biometric-payment-cards-where-are-we-now/>; Jan. 30, 2018. (Year: 2018).*

(Continued)

*Primary Examiner* — Elda G Milef
(74) *Attorney, Agent, or Firm* — Harness, Dickey & Pierce, P.L.C.

(57) ABSTRACT

Embodiments provide a method of facilitating a payment transaction with a payment card of a customer. The method includes receiving a payment transaction request initiated at a merchant terminal. The payment transaction request comprises a merchant transaction amount associated with a purchase entered at the merchant terminal and a fingerprint tap input provided by the customer on a fingerprint input module, the fingerprint tap input indicative of a customer transaction amount associated with the purchase. The method includes facilitating verification of a fingerprint obtained from the fingerprint tap input of the customer by comparing with stored fingerprint of the customer. The method further includes, upon successful verification, determining whether the merchant transaction amount conforms to the customer transaction amount obtained from the fingerprint tap input. The method further includes facilitating the payment transaction associated with the payment transaction request if the merchant transaction amount conforms to the customer transaction amount.

19 Claims, 12 Drawing Sheets

(51) Int. Cl.
*G06Q 20/34* (2012.01)
*G06Q 20/20* (2012.01)

(58) Field of Classification Search
CPC ............. G06Q 20/363; G06Q 20/3674; G06Q 20/40145; G06Q 30/0215; G06Q 30/0238; G06Q 20/40; G06Q 30/06; G06Q 20/20; G06Q 20/32; G06Q 20/401; G06Q 20/3278; G06Q 20/322; G06Q 20/04; G06Q 20/4016; G06Q 20/4014; G06Q 20/341; G06Q 20/352; G06Q 20/105; G06Q 20/3227; G06Q 20/3226; G06Q 30/00; G06Q 20/382; G06Q 20/4012

See application file for complete search history.

(56) References Cited

U.S. PATENT DOCUMENTS

| | | | | |
|---|---|---|---|---|
| 8,618,911 | B2* | 12/2013 | Adams | G06F 21/35 340/5.83 |
| 9,519,901 | B1* | 12/2016 | Dorogusker | G06Q 20/202 |
| 9,646,300 | B1 | 5/2017 | Zhou et al. | |
| 9,646,307 | B2* | 5/2017 | Candelore | G06Q 20/3278 |
| 9,704,353 | B2 | 7/2017 | Lazzaro et al. | |
| 2003/0149661 | A1* | 8/2003 | Mitchell | G06Q 20/40 705/39 |
| 2004/0230488 | A1 | 11/2004 | Beenau et al. | |
| 2005/0131834 | A1 | 6/2005 | Rodriguez et al. | |
| 2007/0118483 | A1 | 5/2007 | Hill et al. | |
| 2007/0271179 | A1 | 11/2007 | Kubota | |
| 2007/0284432 | A1* | 12/2007 | Abouyounes | G06Q 20/40145 235/379 |
| 2009/0255996 | A1 | 10/2009 | Brown et al. | |
| 2014/0095387 | A1* | 4/2014 | Colnot | G06Q 20/42 705/44 |
| 2014/0359757 | A1* | 12/2014 | Sezan | G06K 9/0002 726/19 |
| 2015/0227938 | A1 | 8/2015 | Smets et al. | |
| 2015/0363762 | A1 | 12/2015 | Kimberg | |
| 2017/0364918 | A1 | 12/2017 | Malhotra et al. | |
| 2018/0033013 | A1 | 2/2018 | Park et al. | |
| 2018/0197180 | A1 | 7/2018 | Tsai et al. | |
| 2018/0285549 | A1 | 10/2018 | Sonkar et al. | |
| 2019/0392277 | A1 | 12/2019 | Agrawal et al. | |
| 2020/0322805 | A1 | 10/2020 | Wang et al. | |

OTHER PUBLICATIONS

"Idemia Taps Fingerprints For Japan's First Biometric Payment Card Trial." Press Release. Fingerprints.com <https://www.fingerprints.com/2018/04/25/idemia-taps-fingerprints-for-japans-first-biometric-payment-card-trial/>; Apr. 25, 2018.. (Year: 2018).*

Andolf-Orup, Lina. "Fraud Wars: How Can Biometrics Help Win The Card Fraud Battle." Fingerprints.com ; May 24, 2018. (Year: 2018).*

* cited by examiner

| INPUTS | TAP PATTERN SETTINGS |
|---|---|
| 1 | 1 TAP |
| 2 | 2 CONSECUTIVE TAPS WITHOUT HOLD |
| 3 | 3 CONSECUTIVE TAPS WITHOUT HOLD |
| 4 | 4 CONSECUTIVE TAPS WITHOUT HOLD |
| ⋮ | |
| ANY NUMBER | HOLD FOR 3 SECONDS BEFORE ENTERING EACH DIGIT AFTER THE FIRST DIGIT |
| COMPLETE | HOLD FOR 5 SECONDS AFTER ENTERING ALL DIGITS |

FIG. 4

PAYMENT TRANSACTION METHODS AND SYSTEMS ENABLING VERIFICATION OF PAYMENT AMOUNT BY FINGERPRINT OF CUSTOMER

CROSS-REFERENCE TO RELATED APPLICATION

This application claims the benefit of, and priority to, Singapore Patent Application No. 10201805340T filed on Jun. 21, 2018. The entire disclosure of the above application is incorporated herein by reference.

FIELD

The present disclosure relates to payment transactions and, more particularly to, methods and systems for facilitating payment transactions with payment cards while verifying a payment amount by fingerprints of the customer.

BACKGROUND

This section provides background information related to the present disclosure which is not necessarily prior art.

Nowadays, users prefer the use of banking cards, such as credit cards, debit cards, prepaid cards, etc., for performing financial transactions (e.g., payment transaction). The various banking cards are referred to herein as payment cards. The payment cards are increasingly used for making payments at point-of-sale (POS) terminals available at various facilities including, but not limited to, retail establishments (e.g., merchants like McDonald's™ or Walmart™) or businesses (e.g., ticket reservation centers) that handle cash or credit transactions.

With the increase in the use of payment cards in financial transactions, frauds associated with payment cards are also on the rise. One of the most common security threats associated with payment cards is Point of Sale (POS) related frauds. In a typical POS transaction involving payment cards, the cardholder reaches the POS counter and presents his/her payment card to an agent at the merchant facility standing behind the counter. Commonly, in a POS transaction, a cardholder, often, does not check to verify the transaction amount the agent has entered at the POS device. Also, if the user is a visually impaired individual then the user would have no knowledge or control over what transaction amount the agent behind the counter may have entered. In many instances, frauds may be committed by the agents behind the counters by entering wrong transaction amounts.

Moreover, there may be some scenarios when a POS terminal is not accessible to the cardholder, such as a restaurant. The cardholder hands over his/her payment card to a waiter at the restaurant along with the PIN of the payment card, who, in turn hands it over to the agent standing behind the cash counter. The payment card can be easily misused without the cardholder's knowledge and control. In this and the above scenario, it may be necessary to implement a way of verifying the transaction amount entered by the merchant during a POS transaction.

Another commonly recurring security threat associated with payment cards is theft of the payment card. As the payment card falls into hands of unauthorized sources, the Personal Identification Number (PIN) of the payment card can be easily hacked and misused even before the user realizes and reports the payment card stolen. Hence, PIN is a relatively weaker security for a payment card. In this scenario, it may be vital to implement additional security in the use of payment cards to mitigate the risk of theft of payment cards.

Hence, in light of the foregoing discussion, there appears to be a need for a technique that facilitates a payment transaction with the payment card by not only authenticating the cardholder but also verifying a transaction amount entered by the merchant.

SUMMARY

This section provides a general summary of the disclosure, and is not a comprehensive disclosure of its full scope or all of its features. Aspects and embodiments of the disclosure are set out in the accompanying claims.

Various example embodiments of the present disclosure provide methods, systems, user devices and computer program products for facilitating a payment transaction performed at a merchant terminal with a payment card of a customer. Various embodiments further provide a payment card comprising a fingerprint input module/fingerprint sensor capable of sensing a fingerprint of the customer. Various embodiments further provide a server system for processing a fingerprint tap input provided by the customer and facilitating the payment transaction upon successful verification of a fingerprint of the customer obtained from the fingerprint tap input, where the fingerprint tap input indicates a payment amount entered by the customer.

An embodiment provides a method of facilitating a payment transaction with a payment card of a customer. The method includes receiving, by a server system associated with a payment network, where the payment transaction request is initiated at a merchant terminal. The payment transaction request comprises a merchant transaction amount associated with a purchase entered at the merchant terminal and a fingerprint tap input provided by a customer on a fingerprint input module. The fingerprint tap input is indicative of a customer transaction amount associated with the purchase. The method includes facilitating verification of a fingerprint obtained from the fingerprint tap input of the customer by comparing with the stored fingerprint of the customer. The method further includes, upon successful verification, determining whether the merchant transaction amount conforms to the customer transaction amount obtained from the fingerprint tap input. The method further includes facilitating a payment transaction associated with the payment transaction request if the merchant transaction amount conforms to the customer transaction amount.

Another embodiment provides a server system for facilitating a payment transaction with a payment card of a customer. The server system comprises a memory comprising stored instructions and a processor configured to execute the stored instructions to cause the server system to perform receiving a payment transaction request initiated at a merchant terminal. The payment transaction request comprises a merchant transaction amount associated with a purchase entered at the merchant terminal and a fingerprint tap input provided by a customer on a fingerprint input module. The fingerprint tap input is indicative of a customer transaction amount associated with the purchase. The server system is further caused to facilitate verification of a fingerprint obtained from the fingerprint tap input of the customer by comparing with the stored fingerprint of the customer. The server system is further caused to determine whether the merchant transaction amount conforms to the customer transaction amount obtained from the fingerprint tap input upon successful verification. The server system is further caused to facilitate a payment transaction associated with the payment transaction request if the merchant transaction amount conforms to the customer transaction amount.

Another embodiment provides a payment card. The payment card comprises a fingerprint input module, a storage and a processing system. The fingerprint input module is configured to facilitate provision of a fingerprint tap input, wherein the fingerprint tap input is indicative of a customer transaction amount associated with a purchase. The storage is configured to store instructions and the fingerprint tap input. The processing system is configured to execute the instructions and cause the payment card to perform at least storing the fingerprint tap input. The payment card is further caused to transfer the fingerprint tap input to a merchant terminal when the payment card is in communication with the merchant terminal.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. With that said, for a more complete understanding of example embodiments of the present technology, reference is now made to the following descriptions taken in connection with the accompanying drawings in which:

FIG. 4 is an example representation of a table maintained at a payment server database associated with a payment server, in accordance with an example embodiment;

Figure 1:
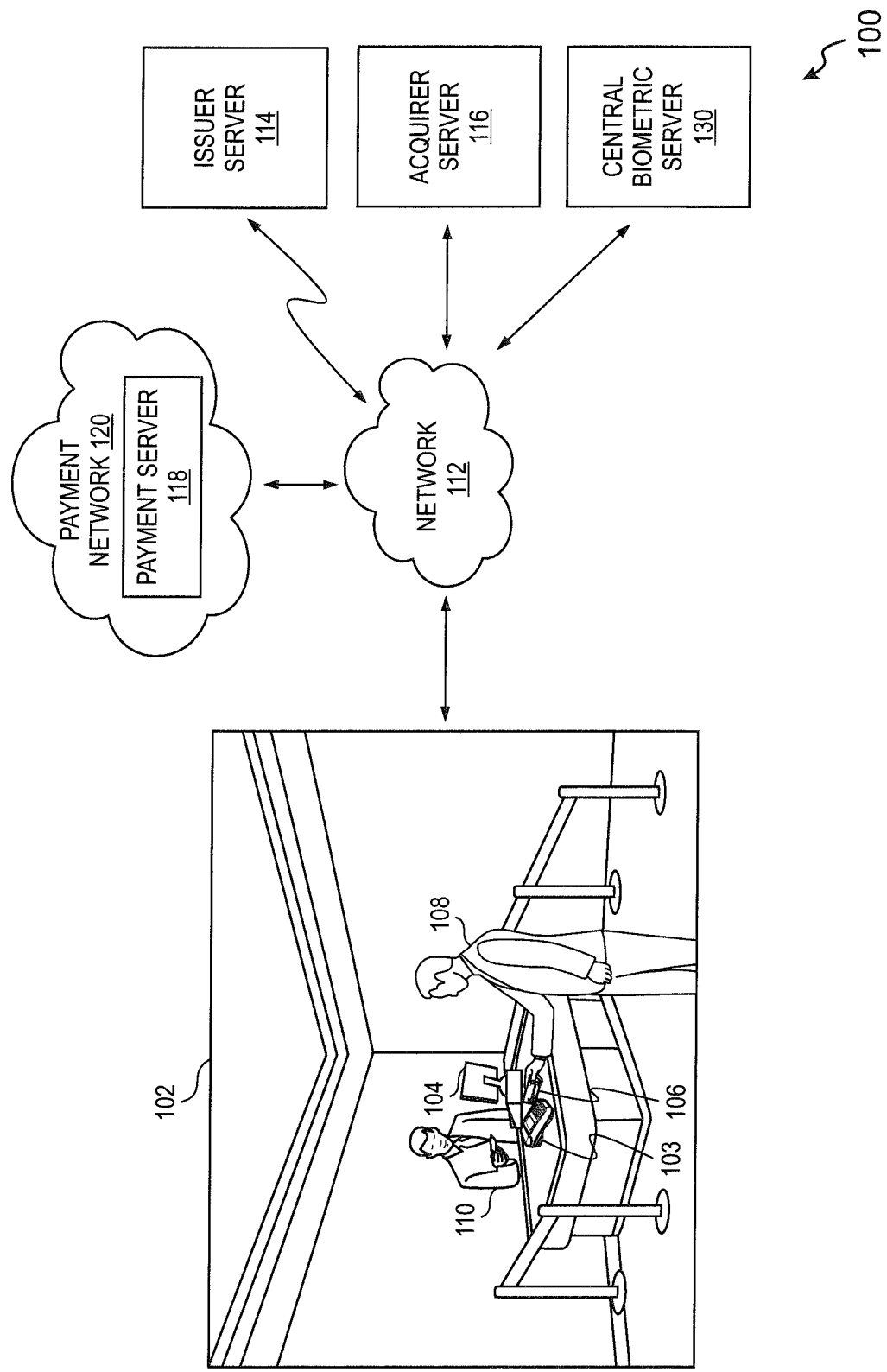
FIG. 1 illustrates an example representation of an environment, in which at least some example embodiments of the present disclosure can be implemented.

The drawings referred to in this description are not to be understood as being drawn to scale except if specifically noted, and such drawings are only exemplary in nature.

Corresponding reference numerals indicate corresponding parts throughout the several views of the drawings.

DETAILED DESCRIPTION

Embodiments will be described, by way of example only, with reference to the drawings. The description and specific examples included herein are intended for purposes of illustration only and are not intended to limit the scope of the present disclosure. In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described, which may be exhibited by some embodiments and not by others. Similarly, various requirements are described, which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "issuer account" used throughout the description refers to a financial account that is used to fund the financial transaction (interchangeably referred to as "payment transaction"). Further, the term "acquirer account" used throughout the description refers to a financial account of a merchant or any entity which receives the funds from the issuer account. Examples of the issuer account and the acquirer account include, but are not limited to a savings account, a credit account, a checking account and a virtual payment account. Each of the issuer account and the acquirer account may be associated with an entity, such as an individual person, a family, a commercial entity, a company, a corporation, a governmental entity, a non-profit organization, and the like. In some scenarios, an issuer or acquirer account may be a virtual or temporary payment account that can be mapped or linked to a primary payment account, such as those accounts managed by PayPal®, and the like.

The term "payment card", used throughout the description, refers to a physical or virtual card linked with a financial or payment account that may be presented to a merchant or any such facility in order to fund a financial transaction via the associated payment account. Examples of the payment card include, but are not limited to, debit cards, credit cards, prepaid cards, digital wallets, virtual payment numbers, virtual card numbers, forex cards, charge cards and stored-value cards. A payment card may be a physical card that may be presented to the merchant for funding the payment. Alternatively or additionally, the payment card may be embodied in the form of data stored in a user device, where the data is associated with a payment account such that the data can be used to process the financial transaction between the payment account and a merchant's financial account.

The term "payment network", used throughout the description, refers to a network or collection of systems used for transfer of funds through use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by MasterCard®, VISA®, Discover®, American Express®, etc.

Various example embodiments of the present disclosure provide methods, systems, user devices and computer program products for facilitating a payment transaction performed at a merchant terminal with a payment card of a customer. Various embodiments further provide a payment card comprising a fingerprint input module/fingerprint sensor capable of sensing a fingerprint of the customer. Various embodiments further provide methods and systems for processing a fingerprint tap input provided by the customer and facilitating the payment transaction upon successful verification of fingerprints of the customer obtained from the fingerprint tap input.

In various example embodiments, the present disclosure provides merchant terminals/POS terminals that can facilitate payment transactions using payment cards, and more particularly, using payment cards equipped with a fingerprint input module/fingerprint sensor capable of sensing fingerprints of the customer. The customer provides a fingerprint tap input through the fingerprint input module provided on the payment card. Alternatively or additionally, the fingerprint input module may also be facilitated or provisioned at a POS terminal (POS machine or merchant device) or a customer device, such as a mobile phone of the customer, for providing fingerprint tap input. The payment card is equipped with a counter, such as a digital counter, in the form of an integrated circuit (IC) for counting the fingerprint taps and storing the fingerprint tap inputs in the payment card on a temporary basis.

Upon swiping the payment card at the POS terminal (or inserting the payment card in case of the payment card having EVM chip), a server system receives a payment transaction request from the merchant terminal. The payment transaction request includes a merchant transaction amount to be paid to a merchant account from an issuer account of the customer for a current purchase and the fingerprint tap input provided by the customer. The merchant transaction amount is entered by the merchant at the POS terminal. The fingerprint tap input is indicative of a customer transaction amount associated with the current purchase. The customer transaction amount may be a maximum debit limit for the current purchase set by the customer. The server system determines the customer transaction amount from the fingerprint tap input based on one or more pre-defined fingerprint tap patterns stored in the server system. The server system stores information corresponding to fingerprint tap patterns and settings for associating numbers/digits with fingerprint tap patterns in a database associated with the server system. As an example, a number '5' may be indicated by 5 fingerprint taps, a number '1' may be indicated by 1 fingerprint tap and the digit '0' may be indicated by a 1 second hold. Likewise, the number 510 may be indicated by 5 consecutive taps without hold followed by a 3 second hold followed by 1 tap followed again by a 3 second hold and a 1 second hold for '0'. The server system allows the customer to customize the settings for association of the fingerprint tap patterns and numbers.

The customer registers his/her fingerprints, a national identity number and a PIN of the payment card of the customer at the server system through an application associated with the server system. The registered information is then linked with already stored national identity information available at a central biometric server. The stored national identity information includes fingerprints, an associated national identity number, age, name, gender and an address of the customer. The server system facilitates verification of a fingerprint obtained from the fingerprint tap input of the customer by comparing the obtained fingerprint with the stored fingerprint of the customer. Upon successful verification of the fingerprint, the server system then determines whether the merchant transaction amount conforms to the customer transaction amount, i.e., if the merchant transaction amount is less than or equal to the maximum limit. Upon successful verification of the same, the payment transaction is approved by an issuer bank. In other words, if the merchant transaction amount exceeds the maximum limit, the payment transaction is declined.

Various embodiments provide methods and systems for facilitating a payment transaction by using a payment card (such as a payment card 200 described with reference to FIG. 2). Various example embodiments of the present disclosure are described hereinafter with reference to FIGS. 1 to 14. An environment for facilitating a payment transaction with a payment card (such as the payment card 200) of a customer is explained in detail with reference to FIG. 1.

FIG. 1 illustrates an exemplary representation of an environment 100, in which at least some example embodiments of the present disclosure can be implemented. In the illustrated embodiment, a merchant facility 102 is shown to be equipped with a Point of Sale (POS) terminal 104 (also referred to as a merchant device 104) and a POS card reader device 103. A typical POS terminal includes the merchant device 104, the POS card reader device 103, cash drawers, printers and barcode scanners, etc. It shall be noted that, in some example merchant facilities, the devices, such as the POS card reader device 103, printers and barcode scanners, etc., may be provisioned within the merchant device 104 and not as peripheral devices and the merchant device 104 collectively with the POS card reader device 103, printers and barcode scanners, etc., can be referred to as a POS terminal or merchant terminal. In some examples, the merchant device 104 can be a telephone or a computer system operated by an agent 110 for performing payment transactions on behalf of a customer 108. As seen in FIG. 1, the merchant device 104 is a computer system operated by the agent 110.

Examples of the merchant facility 102 may include any retail shop, supermarket or establishment, government and/or private agencies, banks, restaurants, ticket counters, toll gates, parking lots, or any such place or establishment where customers visit for performing financial transactions in exchange of any goods and/or services or any transaction that requires financial transactions between the customers and the merchant. As can be seen from the environment 100, the customer 108 is making the financial transaction at the POS terminal 104. It shall be noted that more than one such POS terminal can be present in the merchant facility 102. In conventional scenarios, the customer 108 would reach the POS terminal 104 upon his/her turn.

In the example environment 100, the customer 108, upon reaching the POS terminal 104, accesses his/her payment card 106 comprising a fingerprint input module (see 202 in FIG. 2) to provide a fingerprint tap input indicative of a customer transaction amount. The fingerprint tap input indicative of the customer transaction amount is preferably provided prior to handing over the payment card to the agent 110. The payment card 106 is an example of the payment card 200. Thereafter, the agent 110 swipes the payment card 106 of the customer 108 at the POS card reader device 103 and enters a merchant transaction amount at the POS card reader device 103. The payment card 106 is authenticated and the credit/debit balance is checked. The customer 108 is then able to complete the payment transaction at the POS terminal 104.

Figure 2:
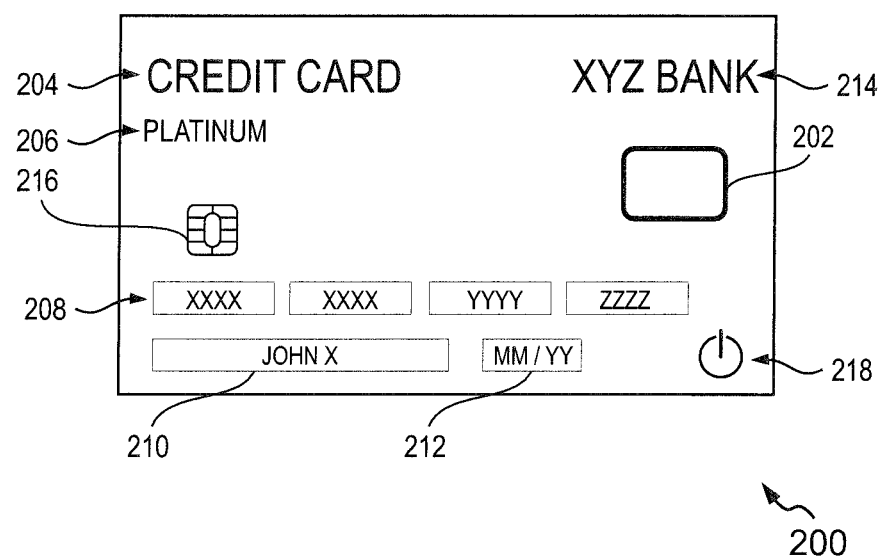
FIG. 2 illustrates an example payment card, in accordance with an example embodiment.

Referring now to FIG. 2, the payment card 200, including the fingerprint input module 202 among other components, is shown in accordance with an example embodiment. The fingerprint input module 202 may be an optical fingerprint sensor or a capacitive fingerprint sensor or any other type of fingerprint sensors already known in the art. The fingerprint input module 202 is capable of scanning or capturing an image of a fingerprint of a finger placed on the fingerprint input module 202. The fingerprint input module 202 stores the fingerprint image in a storage chip 216 provisioned in the payment card 200. Further, the fingerprint input module 202 can receive fingerprint taps and store the fingerprint tap information in the storage chip 216.

In an embodiment, the payment card 200 is equipped with a counter. The counter may be an IC provisioned within the payment card 200 and is configured to operatively communicate with other components of the payment card 200. The counter may be configured to count the fingerprint taps. In one embodiment, the counter further stores and displays the count of fingerprint taps provided by the customer 108 in the fingerprint input module 202. It shall be noted that the counter configured in the payment card 200 may be a digital counter or any other counters that are known in the art or may be later developed. Further, the counter can be a combination of digital counters or any other counters that are known in the art or may be later developed. In some embodiments, a register may be configured into the payment card 200 instead of a counter.

The payment card 200 includes information such as a type of card (e.g., credit/debit) 204, type of customer membership (e.g., platinum/gold, etc.) 206, card number 208, name of the cardholder 210, expiry date of the payment card 212, name of issuing bank 214 printed on one surface (shown in FIG. 2) of the payment card 200. The fingerprint input module 202 and the storage chip 216 are also provisioned on the front surface of the payment card 200 where the printed information appears. The rear surface of the payment card 200, which is not shown in FIG. 2, may include information such as a CVV (Card Verification Value) number and other information as may be already known in the art.

Apart from the fingerprint image information and the fingerprint tap information, the storage chip 216 also stores information corresponding to the payment card 200 and the cardholder. The storage chip 216 further stores instructions, which may correspond to powering on and powering off of the fingerprint input module 202, reading of fingerprint tap inputs, storing of fingerprint tap inputs, erasing of fingerprint tap inputs and transferring of fingerprint tap inputs to a connected device, etc. As an example, the storage chip 216 may include instructions to temporarily store the fingerprint tap information until the payment card 200 is swiped or inserted at a merchant terminal for performing payment transaction. It may be noted that upon transfer of the fingerprint tap inputs to a server system via a payment network from the merchant terminal, the fingerprint tap inputs may be erased from the storage chip 216. In another implementation, only the last fingerprint tap input corresponding to a fingerprint tap pattern may be stored in the storage chip 216, until a new fingerprint tap pattern is provided by the cardholder.

The payment card 200 may be provisioned with a power supply unit, such as a battery unit or a capacitor and a corresponding power button (not shown) for powering the fingerprint input module 202. The power button may be an example of an electronic or a mechanical key comprising control circuitry to process finger taps/presses and thereby triggering the power supply unit. The thickness of the power button conforms to the standard overall thickness of the payment card 200. As an example, the payment card 200 may be so configured that pressing the power button 218 once for a pre-defined duration activates the payment card 200 and pressing the power button twice for a pre-defined duration deactivates or turns off the payment card 200.

In an example, the payment card 200 may be configured such that when the cardholder provides a tap on the fingerprint input module 202, that lasts for a pre-configured duration (say, 5 seconds), the fingerprint input module 202 is powered on. As an example, a tap on the fingerprint input module 202 that lasts for 5 seconds may activate sensors (capacitive or optical) of the fingerprint input module 202. The storage chip 216 may read such a tap as a 'no input' tap and hence information corresponding to such a tap is not stored in the storage chip 216. Any fingerprint tap received through the fingerprint input module 202 after activation of the fingerprint input module 202 may be instructed to be read as fingerprint tap inputs and hence may be stored in the storage chip 216. Similar techniques may be implemented for powering off the fingerprint input module 202.

In yet another embodiment, the payment card 200 may be so configured that when the payment card 200 is inserted at the POS card reader device 103 at the POS terminal 104, the fingerprint input module 202 is powered on and a communication module transfers information in the storage chip 216 to the POS terminal 104. The hardware components of the payment card 200 are shown and will be explained in detail with reference to FIG. 8 later in this disclosure.

Referring again to FIG. 1, in a scenario where a fingerprint input module (such as the fingerprint input module 202) is powered on upon insertion of the payment card 106 at a POS card reader device, such as the POS card reader device 103, the payment card 106 is handed over to the agent 110 prior to provision of the fingerprint tap inputs. Once powered on, the customer 108 can provide fingerprint tap input while the payment card 106 is still inserted at the POS card reader device 103.

Figure 3:
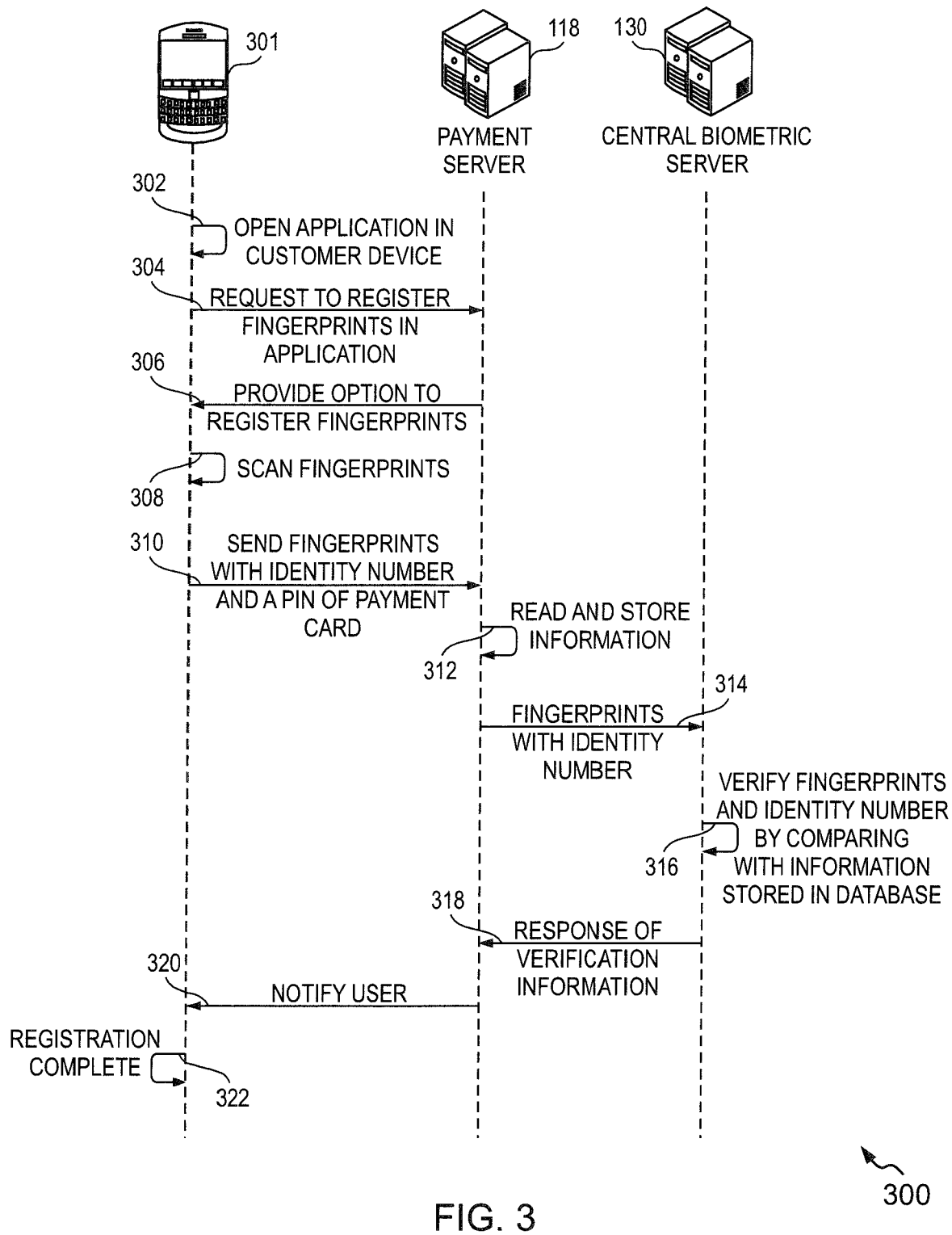
FIG. 3 represents a sequence flow diagram representing a method of registration of a customer's fingerprints at a server system, in accordance with an example embodiment.

It shall be noted that the fingerprint tap input can alternatively be provided through fingerprint input modules provisioned at the POS terminal 104 or the POS card reader device 103. Further, the fingerprint tap input can be provided through fingerprint input modules provisioned at a customer device (customer device is shown in FIG. 3). It will be understood that if the fingerprint input module is provisioned on a customer device, the customer device may have to be additionally provisioned with one or more additional hardware modules, such as a USB port, NFC, Bluetooth, WiFi, etc., in operative communication with the fingerprint input module that enables transfer of the fingerprint tap input from the customer device to the POS terminal 104.

Upon swiping the payment card 106 at the POS terminal 104, a payment transaction request is generated and payment transaction between the user (issuer account) and the enterprise/merchant (acquirer account) is facilitated by a server system and a payment network 120. Examples of the server system include an issuer server 114, an acquirer server 116 and a payment server 118. In some cases, the issuer server 114, the acquirer server 116 and the payment server 118 can be a single entity, or any two of these servers may be a single entity. The payment transaction request comprises a merchant transaction amount entered by the agent 110 at the POS terminal 104, the merchant transaction amount associated with a current purchase of goods and/or services at the merchant facility 102 and the fingerprint tap input indicative of the customer transaction amount. The payment transaction is received by the acquirer server 116, which sends it to the issuer server 114 through the payment network 120 facilitated by the payment server 118.

The issuer server 114 is associated with a financial institution normally called an "issuer bank" or "issuing bank" or simply "issuer" or simply "bank", in which the customer 108 may have an issuer account, which issues one or more payment cards, such as a credit card or a debit card. The payment cards are linked to a unique payment account number of the customer 108. The unique account number, as an example, can be a PAN number assigned to tax payers in India. The customer 108, being the cardholder, can use any of the payment cards to tender payment for the purchase. The issuer bank is responsible for determining whether a customer's issuer account is in good standing and whether the purchase is covered by the customer's available credit line or account balance. Based on these determinations, the payment transaction associated with the payment transaction request is approved or declined.

The acquirer server 116 is associated with a financial institution normally called as a "merchant bank" or the "acquiring bank" or "acquirer bank" or simply "acquirer", in which the merchant may have an account. The acquirer server 116 is associated with the acquirer bank. In an embodiment, the environment 100 may include a plurality of acquirer servers and a plurality of acquirers associated with the one or more merchants. Similarly, the environment 100 may include a plurality of issuer servers associated with a plurality of issuers, wherein the customer 108 may have financial accounts in each of the issuers.

In one embodiment, the payment server 118 is associated with the payment network 120. The payment network 120 may be used by payment cards issuing authorities as a payment interchange network. Examples of payment interchange networks include, but not limited to, Mastercard® payment system interchange network. The Mastercard® payment system interchange network is a proprietary communications standard promulgated by Mastercard® International Incorporated for the exchange of financial transaction data between financial institutions that are members of Mastercard® International Incorporated. (Mastercard® is a registered trademark of Mastercard® International Incorporated located in Purchase, N.Y.).

The payment server 118 facilitates a web or a mobile application interface for enabling registration of the customer's fingerprints. The registered fingerprints are stored in a database associated with the payment server 118. The payment server 118 further facilitates linking of the registered fingerprints with stored fingerprints present in a central biometric server 130. The payment server 118 facilitates verification of a fingerprint extracted from the fingerprint tap input by comparison with a stored fingerprint present in either the payment server 118 or the central biometric server 130. The payment server 118 further identifies a customer transaction amount from the fingerprint tap input and determines if the merchant transaction amount conforms to the customer transaction amount. The payment server 118 is described in detail with reference to FIG. 13.

The issuer server 114, the acquirer server 116 and the payment server 118 communicate with one another using a network 112. Examples of the network 112 may include any type of wired network, wireless network, or a combination of wired and wireless networks. A wireless network may be a wireless local area network ("WLAN"), a wireless wide area network ("WWAN"), or any other type of wireless network now known or later developed. Additionally, the network 112 may be or include the Internet, intranets, extranets, microwave networks, satellite communications, cellular systems, personal communication services ("PCS"), infrared communications, global area networks, or other suitable networks, etc., or any combination of two or more such networks.

Using the payment network 120 one or more systems of the acquirer/acquirer server 116 will communicate with one or more systems of the issuer/issuer server 114 to determine whether the customer's account is in good standing and whether the amount of the purchase is covered by the customer's available account balance. Based on these determinations, authorization of the payment transaction is declined or accepted. When the authorization is accepted, the available balance of the customer's account is decreased.

The environment 100 is further depicted to optionally include the central biometric server 130. Herein, the central biometric server 130 refers to a data center managed by a Government body, such as Unique Identification Authority of India (UIDAI) in India, Passport center, Income Tax Department, etc. The central biometric server 130 is responsible for issuance and maintenance of unified national identities to citizens (including the customer 108) and associating the national identity information with their respective issuer accounts present throughout the country. National identity information includes biometric data including, but not limited to, fingerprint data, iris data, facial data, palm data, etc., a national identity number, name, address, age, gender etc., of the customer 108. The payment server 118 and the central biometric server 130 are in operative communication with one another either directly or indirectly through intermediaries.

When the customer 108 is issued a new payment card, such as the payment card 200 depicted in FIG. 2, for performing payment transactions using that card, the customer 108 may initially be required to register his/her fingerprints and the national identity number at the payment server 118. The registered fingerprints and the national identity number may then be linked with the customer's national identity information present in the central biometric server 130 upon verification. The customer 108 may further be required to register one or more PINs associated with one or more payment cards at the payment server 118. FIG. 3 includes a simplified schematic flow diagram 300 representing a method of registration of fingerprints at the payment server 118, in accordance with an example embodiment. The customer 108 logs into a web application or a mobile application associated with the payment server 118 on a customer device 301.

At 302, the user opens the web application/mobile application associated with the payment server 118 on the customer device 301. Examples of the customer device 301 include, but are not limited to, a personal computer (PC), a tablet device, a personal digital assistant (PDA), a smartphone and a laptop. The customer device 301 may be provisioned with fingerprint sensors or fingerprint input modules capable of sensing a fingerprint of the customer 108. Additionally, the fingerprint input module may be a peripheral device coupled/connected to the customer device 301. In FIG. 3, the customer device 301 is depicted as a smartphone.

At 304, the payment server 118 receives a request to register the fingerprints of the customer 108 through the application. The application may present an interface comprising actionable icons (not shown) to enable generation of a request by the customer 108 to register his/her fingerprints to be used for future transactions.

At 306, the payment server 118 provides an option in the application to register all fingerprints of the customer 108. Herein, an option may refer to a command with example texts, such as, "scan your fingerprints" or "connect your device to scan fingerprints" etc. At this instant, the customer 108 may place one of his/her fingers on the fingerprint input module of the customer device 301 or connect the peripheral fingerprint sensor to the customer device 301. Additionally, an option may also refer to a window displayed on the screen of the customer device 301, which may present instructions to the customer 108 as to how and when to place a finger on the fingerprint sensor. Further, the application presents one or more fields on the screen of the customer device 301 where the customer 108 can provide the national identity number and a PIN of the payment card 106/200.

At 308, the customer 108 scans fingerprints of all fingers using the fingerprint sensor associated with the customer device 301 based on instructions displayed on the window. At this instant, the window displayed on the screen of the customer device 301 notifies the customer 108 if legible fingerprints are received or if the customer needs to repeat scanning. At the same time, the customer 108 enters the national identity number and the PIN of the payment card in the respective fields. At 310, the scanned fingerprints, the national identity number and the PIN of the payment card are sent to the payment server 118 by the application via the network 112. At 312, the server system reads the scanned fingerprints and stores the information in the database associated with the payment server 118.

At 314, the payment server 118 sends fingerprints and the national identity number to the central biometric server 130 for linking the fingerprints and the national identity number captured by the payment server 118 with already available national identity information of the customer 108 stored in the central biometric server 130. It shall be noted that, national identity information of a customer is stored in the central biometric server 130 only if the customer has enrolled for it and a national identity number has been issued to the customer following the enrollment process.

At 316, the central biometric server 130 verifies if the fingerprints and the national identity number received from the payment server 118 and the already available fingerprints and the national identity number stored in the central biometric server 130 match.

At 318, a response of verification is sent to the payment server 118. If a match occurs, the payment server 118 may be notified that the registration was successful. However, if a match does not occur, the payment server 118 may be notified to repeat the scanning process.

At 320, the customer 108 is notified of the registration success/registration failure in the application. Additionally, the customer 108 may be notified through text messages or emails. If the registration fails, the customer 108 may be required to repeat the scanning process. At 322, the registration process is completed. The customer 108 can now perform financial transactions at the POS terminal 104 by providing fingerprint tap input in the payment card 106/200.

FIG. 4 is an example representation of a table 400 storing fingerprint tap patterns and settings for associating fingerprint tap patterns to numbers, maintained at the database associated with the payment server 118. At any instant during or after registration of the fingerprints of the customer 108 at the payment server 118, the payment server 118 may also facilitate setting of tap patterns to indicate various numbers and digits. As seen in FIG. 4, the table 400 includes listings of inputs in the form of numbers, digits and texts in a first column 402 and tap patterns settings in a second column 404. It may be noted that the table 400 may include default tap patterns as set by the manufacturer/issuer of the payment card 106. However, the payment server 118 allows customization of the tap patterns by customers. Each digit and number is associated with particular tap patterns as customized by the customer 108. Once the tap pattern settings are registered, they can be used in future payment transactions performed using the payment card 200.

In an example setting, a number/digit '1' may be indicated by 1 tap and a number 'n', may be indicated by 'n' consecutive taps without hold. Hence, based on this setting, if the customer 108 wishes to enter the digit/number 1, the tap pattern provided through the fingerprint input module should be 1 tap. Likewise, if the customer 108 wishes to enter the digit/number 3, the tap pattern should be 3 consecutive taps without hold. Similarly, if the customer 108 wishes to enter a number, the tap pattern should include a tap pattern indicating the first digit of the number followed by a hold of 3 seconds before tapping the next subsequent digit of the number, and so on. As an example, if the customer 108 wishes to enter a number '514' through the fingerprint input module, the tap pattern should include 5 consecutive taps without hold followed by a 3 second hold, 1 tap followed again by a 3 second hold and 4 consecutive taps without hold.

In another example setting, the fingerprint of a particular finger may be mapped to a number. As an example, the middle finger may be mapped to a number, say '5'. Similarly, the thumb may be mapped to a number say '1' and so on. Likewise, a number '10' may be indicated by or mapped to two taps with the middle finger and a number '6' may be indicated by or mapped to two taps with the thumb. In such a setting, if the customer 108 desires to enter a number 516, the customer 108 can tap the fingerprint input module 202 with the middle finger followed by a 3 second hold, then a tap with the thumb followed again by a 3 second hold and then two consecutive taps with the thumb without hold. It shall be noted that the table 400 shown in FIG. 4 is only exemplary and for the purposes of explanation. In practical, the payment server database may include multiple such tables listing varying settings and each table may have fewer or more columns and rows than depicted in FIG. 4.

Figure 5A:
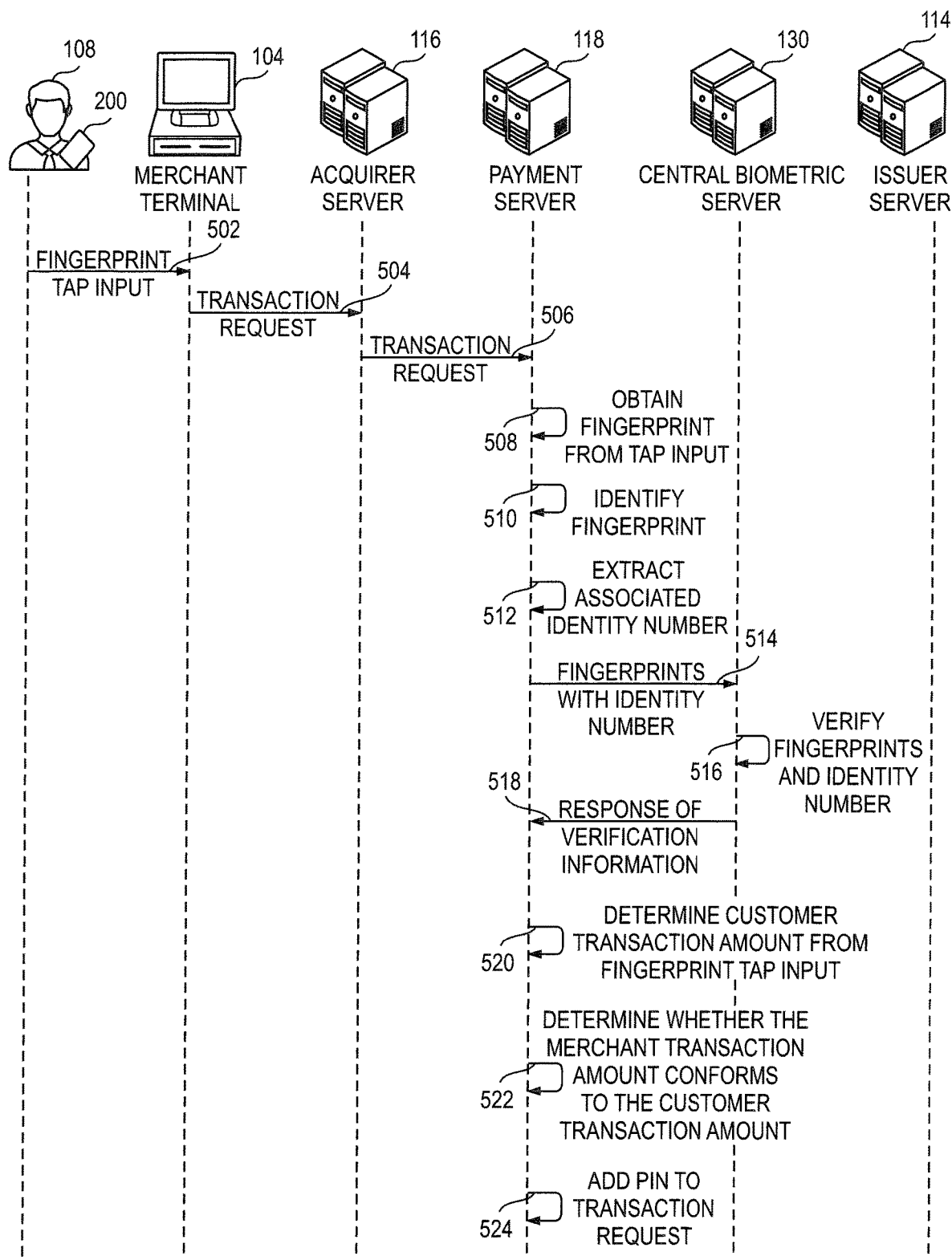
FIGS. 5A and 5B represent a sequence flow diagram representing a method of facilitating a payment transaction with the payment card of FIG. 2 of the customer, in accordance with an example embodiment.
Figure 5B:
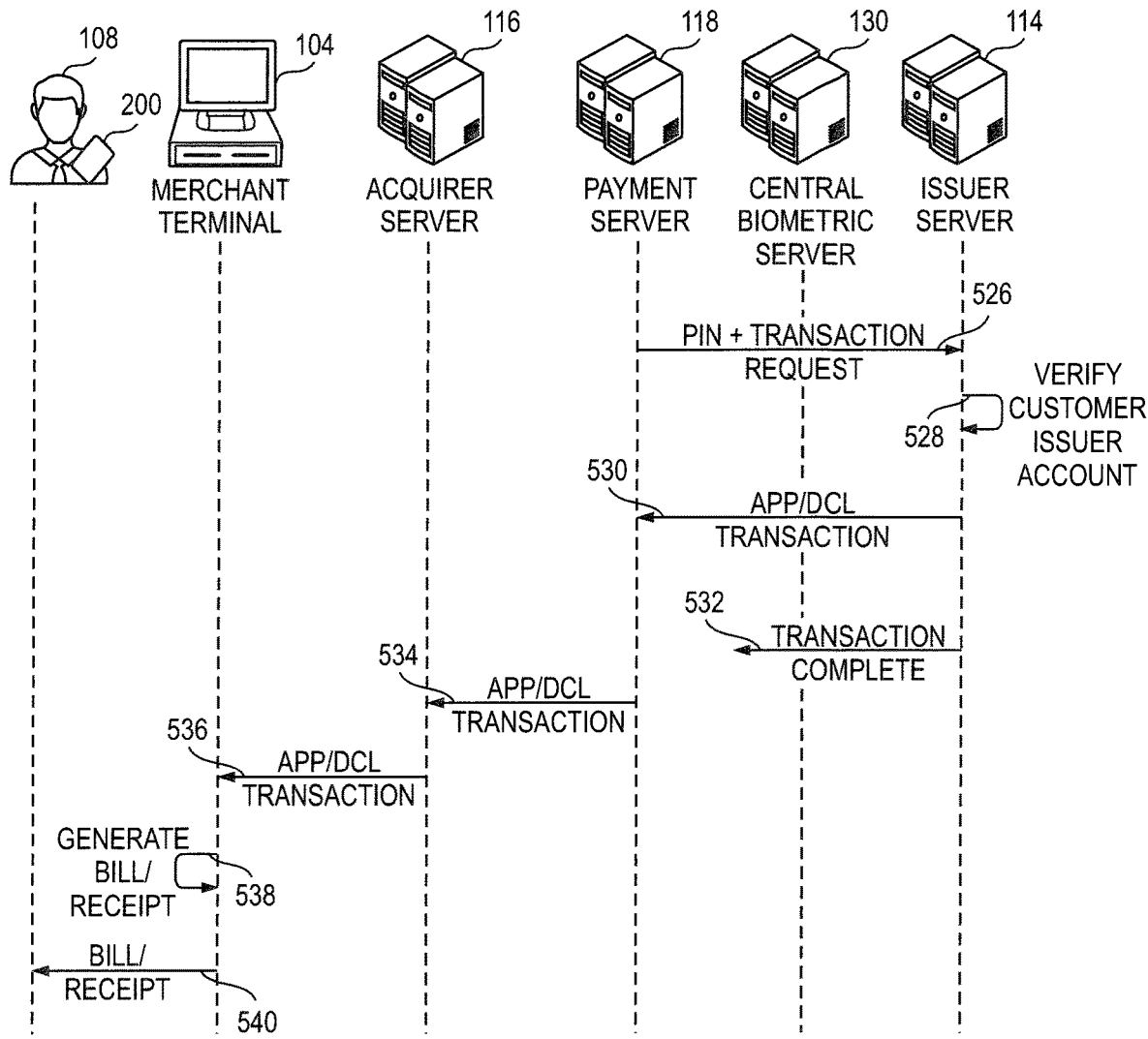

FIGS. 5A and 5B include a simplified schematic flow diagram 500 representing a method of facilitating a payment transaction with the payment card 200 of the customer 108. As an example, the customer 108 has made a purchase at the merchant facility 102 and is waiting at the POS terminal 104 for his/her turn. The customer 108 powers on the payment card 200 using one of the techniques as described previously and provides the fingerprint tap input indicative of the customer transaction amount through the fingerprint input module 202 provided in the payment card 200. Thereafter, the customer 108 hands over the payment card 200 to the agent 110, who swipes or inserts the payment card 200 at the POS card reader device 103. The fingerprint tap input is stored in the storage chip 216 of the payment card 200. The customer transaction amount can be decided by the customer 108 depending upon the transaction. For instance, the customer transaction amount can be exactly the same as the purchase amount at the time of billing, or it can be an approximate number so that the actual bill amount should not be ordinarily greater than the approximate number.

At 502, the fingerprint tap input is received at the POS terminal 104. As the payment card is swiped/inserted into the POS card reader device 103, the POS card reader device 103 reads the information stored in the storage chip 216 of the payment card 200. The fingerprint tap input is indicative of the customer transaction amount. As already described, the customer transaction amount may be a maximum debit limit that can be debited from the customer's issuer account for the current purchase set by the customer 108. In other scenarios, the customer transaction amount may be equal to a bill amount, which is a sum total of all the prices of the items purchased and/or services availed at the merchant facility 102 including taxes.

At 504, the POS terminal 104 sends the transaction request to the acquirer server 116. The transaction request includes the merchant transaction amount entered by the merchant at the POS terminal 104 and the fingerprint tap input indicating the customer transaction amount. The agent 110 may key-in the merchant transaction amount using the POS card reader device 103. At 506, the transaction request is sent from the acquirer server 116 to the payment server 118.

At 508, the payment server 118 obtains a fingerprint from the fingerprint tap input. The fingerprint may be obtained by performing various data or image processing algorithms on the fingerprint tap input. At 510, the payment server 118 identifies the fingerprint as a registered fingerprint of the customer 108 and extracts the associated national identity number at 512. It shall be noted that if the payment server 118 fails to identify a fingerprint of a customer, then the customer may be required to register the same by following steps described in the sequence flow diagram 300.

At 514, the payment server 118 sends the fingerprint and the extracted national identity number to the central biometric server 130 for verification. At 516, the central biometric server 130 verifies whether the fingerprint and the national identity number sent by the payment server 118 match with already stored fingerprint and national identity number. The verification is performed by comparison of the fingerprint and the national identity number sent by the payment server 118 with the stored fingerprint and the national identity number, respectively, present at the central biometric server 130.

At 518, the central biometric server 130 sends a response of verification to the payment server 118. If successfully verified, the payment server 118 may be notified that the verification was successful and the transaction request may be passed to the issuer bank for approval. In the event of unsuccessful verification, a notification of failure may be sent to the payment server 118. The payment server 118 may then decline the transaction request and send a request for registration of fingerprints and the national identity number to the customer 108.

At 520, upon successful verification of a fingerprint, the payment server 118 determines the customer transaction amount from the fingerprint tap input. At 522, the payment server 118 determines whether the merchant transaction amount conforms to the customer transaction amount. The merchant transaction amount conforms to the customer transaction amount if the merchant transaction amount is less than or equal to the customer transaction amount, i.e., the maximum debit limit and does not exceed the customer transaction amount.

If the merchant transaction amount conforms to the customer transaction amount, then the sequence flow proceeds to operation 524. If the merchant transaction amount exceeds the customer transaction amount, then the transaction may not be passed to the issuer server 114 for approval.

At 524, the payment server 118 adds the registered PIN of the payment card to the transaction request. It should be noted that the PIN shall be provided (not shown) by the customer 108 via the merchant terminal 104, as part of the transaction request. At 526, the transaction request and the registered PIN of the payment card are sent to the issuer server 114.

At 528, the issuer server 114 verifies whether the PIN received from the payment server 118 is linked to an associated issuer account of the customer 108 for which the payment card 200 was issued to the customer 108. The issuer server 114 further checks the account balance of the issuer account and if the account balance is enough to accommodate the current transaction. Based on these determinations, a payment transaction associated with the payment transaction request may be facilitated.

At 530, the issuer server 114 sends a transaction approval or decline (see, APP/DCL) notification/message to the payment server 118. At 532, the transaction is completed. At this instant, a text notification including information on the transaction completion may be received at the customer device 301 of the customer 108.

At 534, the payment server 118 sends the transaction approval or decline notification/message to the acquirer server 116. At 536, the acquirer server 116 sends the transaction approval or decline notification/message to the POS terminal 104.

At 538, the POS terminal 104 generates a bill or a receipt for the payment transaction. The bill may include the transaction amount, taxes, transaction date, POSID information, issuer bank name and acquirer bank name, among other information. The bill is printed at the POS terminal 104.

At 540, the bill is handed over to the customer 108.

In another embodiment, the POS terminal 104 may be provisioned with a fingerprint input module or a fingerprint sensor enabling reception of fingerprint tap input from the customer 108. Additionally, a fingerprint input module or fingerprint sensor can also be provisioned at the customer device (such as the customer device 301). Such provisions may be necessary when the customer 108 fails to power on the payment card 200, as an example. Mechanisms to power on the payment card 200 are already described with reference to FIG. 2.

In another embodiment, the payment transaction can also be processed without having to include the central biometric server 130 for verification of fingerprints. As described, the payment server 118 also stores the registered fingerprints and national identity number of the customer 108. Verification can be completed by comparison of received fingerprints and national identity number with stored fingerprints and national identity number at the payment server 118. The payment server 118 behaves as a biometric server for verification of the fingerprint and the national identity number as being associated with the customer 108 and that the received fingerprints and national identity number are legitimate.

Figure 6:
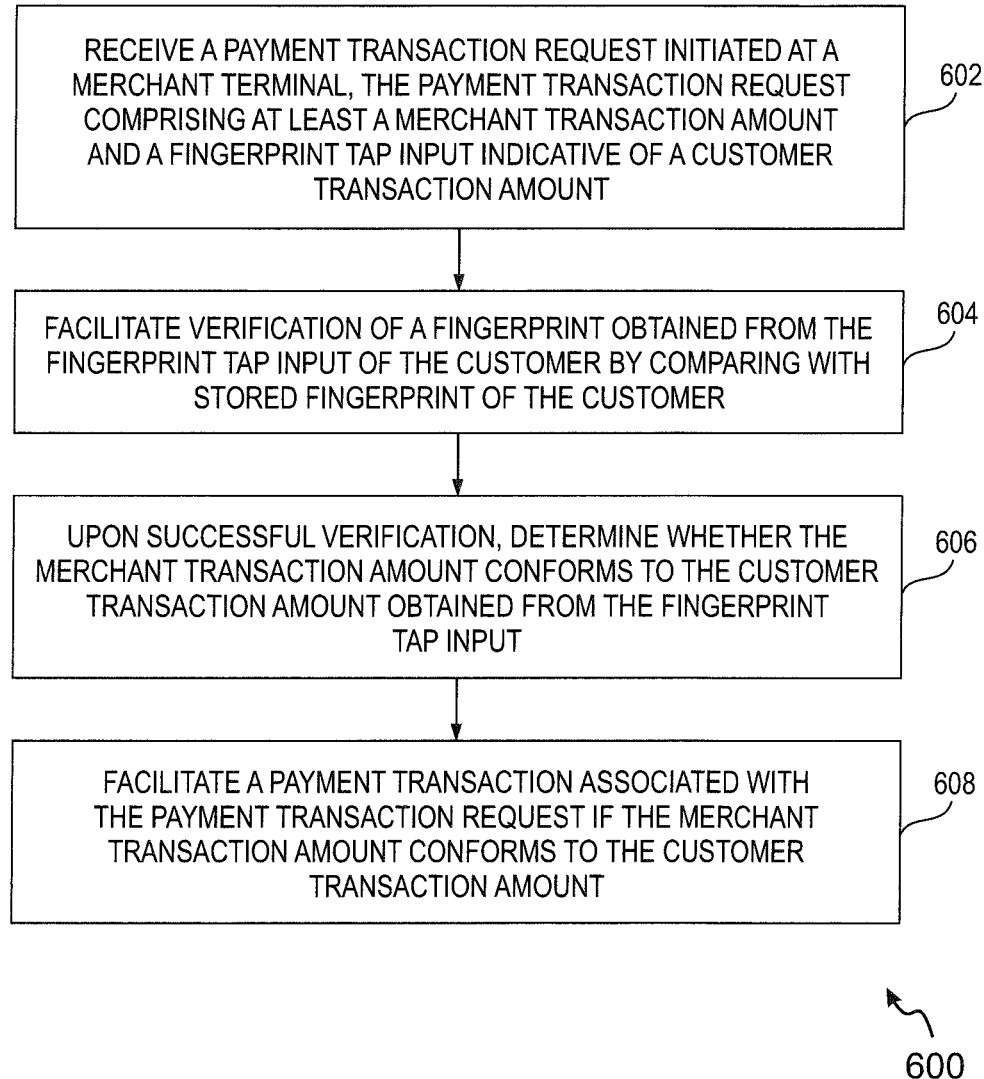
FIG. 6 illustrates a flow diagram of a method of facilitating the payment transaction with the payment card of FIG. 2 of the customer, in accordance with an example embodiment.

FIG. 6 illustrates a flow diagram of a method 600 for facilitating a payment transaction with a payment card, in accordance with one embodiment of the present disclosure. The method 600 depicted in the flow diagram may be executed by, for example, the payment server 118. Operations of the flow diagram 600, and combinations of operation in the flow diagram 600, may be implemented by, for example, hardware, firmware, a processor, circuitry and/or a different device associated with the execution of software that includes one or more computer program instructions. The operations of the method 600 are described herein with help of a server system, such as the payment server 118. It is noted that the operations of the method 600 can be described and/or practiced by using a system other than the payment server 118. The method 600 starts at operation 602.

At 602, the payment server 118 receives a payment transaction request initiated at a merchant terminal (the POS terminal 104). The payment transaction request includes at least the merchant transaction amount and a fingerprint tap input indicative of the customer transaction amount.

At 604, the payment server 118 facilitates verification of a fingerprint obtained from the fingerprint tap input of the customer 108 by comparing with the stored fingerprint of the customer 108. In an embodiment, the payment server 118 sends the fingerprint and an associated national identity number of the customer 108 to a biometric server, where the biometric server 130 verifies the authenticity of the fingerprints and the national identity number. In another embodiment, the payment server 118 verifies the authenticity of the fingerprints and the national identity number. Verification is performed by comparison of the received fingerprint and the national identity number with existing fingerprint and national identity number stored in either the biometric server 130 or the payment server 118. The comparison is performed based on one or more image processing algorithms.

At 606, upon successful verification of the fingerprint, the payment server 118 determines whether the merchant transaction amount conforms to the customer transaction amount obtained from the fingerprint tap input, i.e., if the merchant transaction amount is less than or equal to the customer transaction amount and does not exceed the customer transaction amount.

At 608, the payment server 118 facilitates a payment transaction associated with the payment transaction request if the merchant transaction amount conforms to the customer transaction amount. An issuer server (such as the issuer server 114) receives the transaction request along with a PIN of the payment card. The issuer server 114 verifies the authenticity of the PIN and checks the balance in the issuer account of the customer 108 and thereby approves or declines the transaction.

Figure 7:
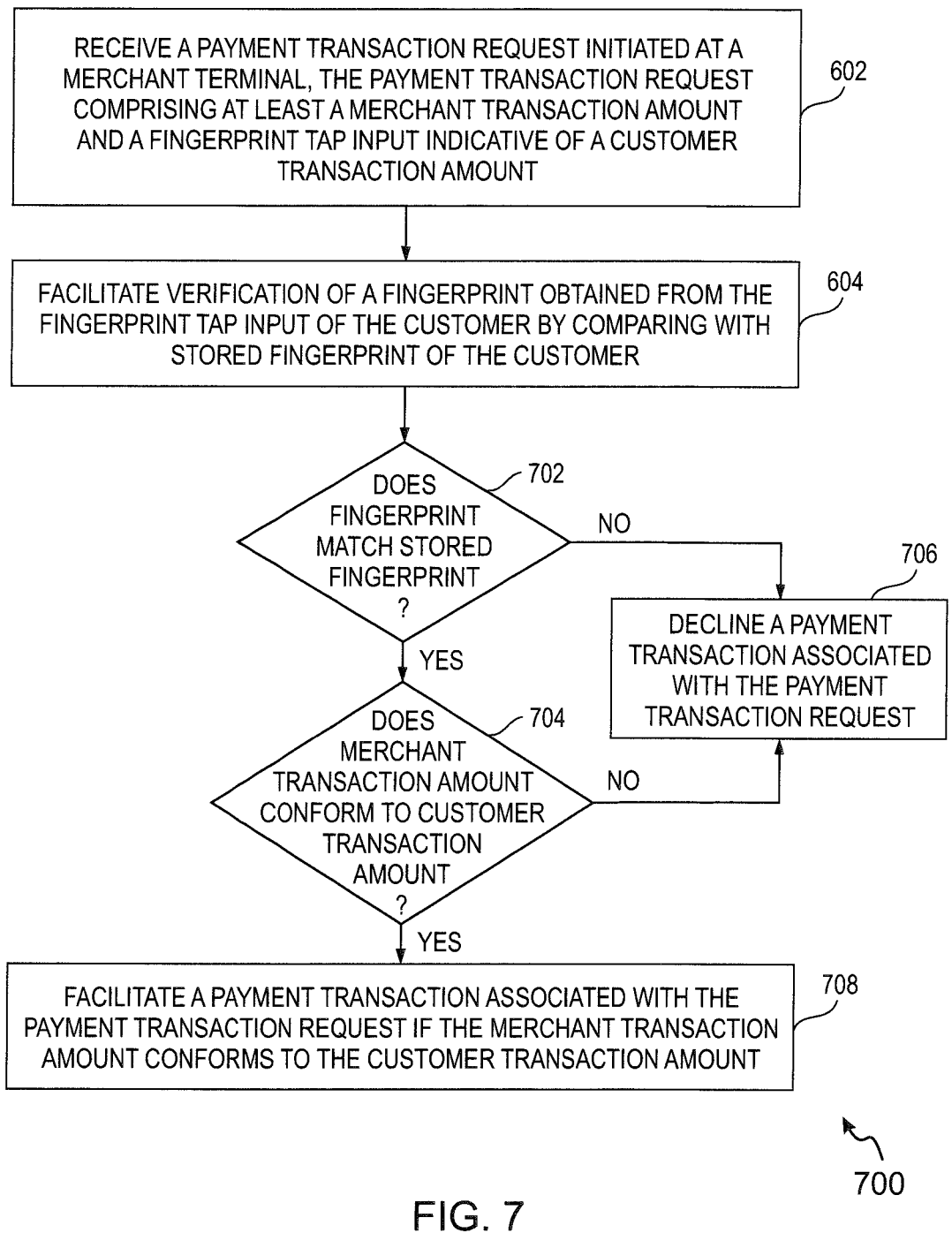
FIG. 7 illustrates a flow diagram of the method of facilitating the payment transaction with the payment card of FIG. 2 of the customer, in accordance with another example embodiment.

FIG. 7 illustrates a flow diagram of a method 700 for facilitating a payment transaction with a payment card, in accordance with one embodiment of the present disclosure. The method 700 depicted in the flow diagram may be executed by, for example, the payment server 118. Operations of the flow diagram 700, and combinations of operation in the flow diagram 700, may be implemented by, for example, hardware, firmware, a processor, circuitry and/or a different device associated with the execution of software that includes one or more computer program instructions. The operations of the method 700 are described herein with help of the payment server 118. It is noted that the operations of the method 700 can be described and/or practiced by using a system other than the payment server 118. The method 700 starts at operation 602 followed by operation 604 as described in the method 600. The operation steps 602 and 604 are not described here for the sake of brevity. The operation 604 is followed by the operation 702.

At 702, the payment server 118 determines if the received fingerprint matches the stored fingerprint. The stored fingerprint may be present in the payment server 118 or a biometric server. The comparison is performed based on one or more image processing algorithms. The payment transaction request includes at least the merchant transaction amount and a fingerprint tap input indicative of the customer transaction amount.

If it is determined that the received fingerprint matches the stored fingerprint, then, at 704, the payment server 118 further determines whether the merchant transaction amount conforms to the customer transaction amount. If it is determined that the received fingerprint fails to match the stored fingerprint, then, at 706, the payment server 118 declines a payment transaction associated with the payment transaction request, i.e., the payment transaction request is not sent to the issuer server 114.

At 704, if the payment server 118 further determines that the merchant transaction amount conforms to the customer transaction amount or if the merchant transaction amount is less than or equal to the customer transaction amount, then at 708, the payment server 118 facilitates the payment transaction associated with the payment transaction request. If at 704, the payment server 118 determines that the merchant transaction amount does not conform to the customer transaction amount or if the merchant transaction amount exceeds the customer transaction amount, then the method proceeds to 706.

Figure 8:
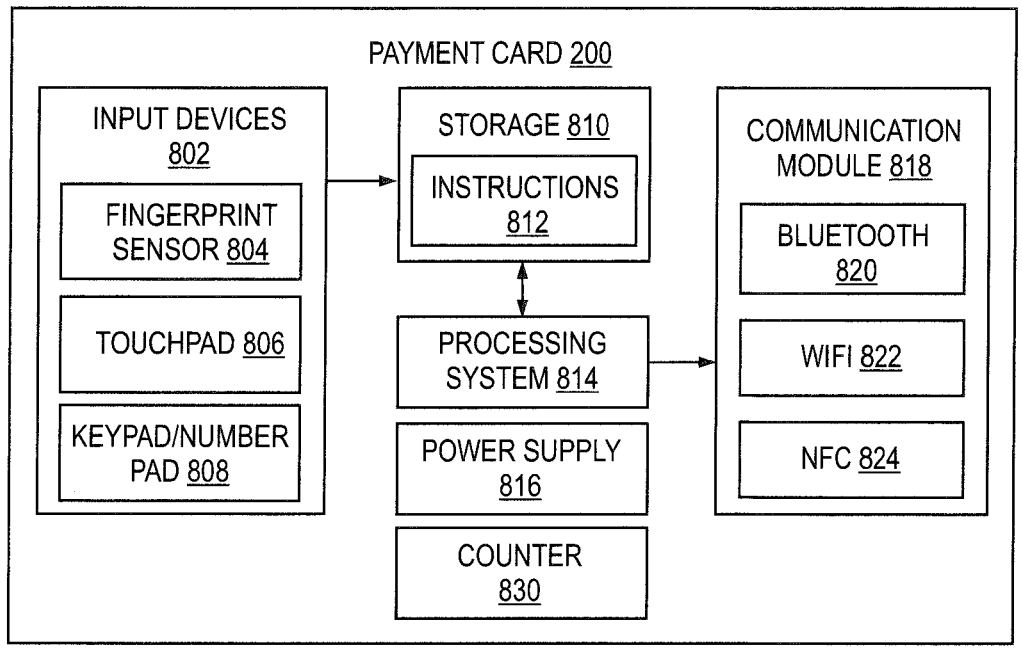
FIG. 8 is a simplified schematic block diagram representation of the payment card of FIG. 2, in accordance with an example embodiment.

FIG. 8 is a schematic representation 800 of the electronic components of the payment card 106/200, in accordance with an example embodiment. Some examples of the payment card 200 can be a card associated with Mastercard® that can be a chip-based (e.g., EMV card) debit and/or credit card used for financial transactions. It should be understood that the payment card 200, as illustrated and hereinafter described, is merely illustrative of one type of device and should not be taken to limit the scope of the embodiments. As such, it should be appreciated that at least some of the components described below in connection with that the payment card 200 may be optional and thus in an example embodiment may include more, less or different components than those described in connection with the example embodiment of FIG. 8. As such, among other examples, the payment card 200 could be any electronic device comprising a processor and a memory.

As shown in FIG. 8, the payment card 200 can support one or more input devices 802. Examples of the input devices 802 may include, but are not limited to, a fingerprint sensor 804 (such as the fingerprint sensor 202 in FIG. 2), a touchpad 806 and a physical keypad 808. The fingerprint sensor 804 is configured to sense the presence of a fingerprint, capture finger tap inputs, multi-finger tap inputs, multi-finger gesture inputs, capture an image of the fingerprint and store the fingerprint in a storage, such as the storage 810. The fingerprint sensor 804 may be an optical sensor or a capacitive sensor, as an example. The fingerprint sensor 804 may be capable of accommodating and scanning one finger at a time.

The representation 800 of the payment card 200 depicts a storage component or a memory component 810. Examples of the storage component 810 may include a non-removable memory and/or removable memory. The non-removable memory can include RAM, ROM, flash memory, or other well-known memory storage technologies. The removable memory can include flash memory and smart cards. In this example, the storage component 810 is a chip (Integrated Circuit) based storage/memory. Apart from fingerprint data, customer and card information (e.g., type of card, type of customer membership, card number, name of the cardholder, cardholder's account number, PIN, expiry date of the payment card, name of issuing bank, etc.) are also stored in the storage component 810. The storage component 810 may also be used for storing data and/or instructions, such as instructions 812.

The instructions 812 are executable by a processing system 814 to enable the storage component 810 to read a fingerprint tap, to store a fingerprint tap, to transfer or write a fingerprint tap to another device, to distinguish a legible tap from unclear taps, to identify what a tap indicates, etc. The processing system 814 can be a signal processor, microprocessor, ASIC, or other control and processing logic circuitry for performing such tasks as signal coding, data processing, input/output processing, power control, and/or other functions. The processing system 814 may be configured to perform processing of the fingerprint/fingerprint image. In another embodiment, a processing system, such as the processing system 814, may not be provisioned within the payment card 200. The storage component 810 may be configured with the instructions 812 and processing capabilities.

The payment card 200 may include a power supply 816 which comprises a thin battery or a capacitor used to power the input devices 802 and optionally some of the other card electrical components, such as the processing system 814 of the payment card 200. In an alternate embodiment, the payment card 200 may or may not need a battery, wherein the payment card is configured to be powered when inserted into a terminal, such as a POS card reader device (such as the POS card reader device 103).

A communication module 818 can be coupled to one or more antennas (not shown in the FIG. 8) and can support two-way communications between the processing system 814 and external devices, as is well understood in the art. The communication module 818 is shown generically and can be configured with wireless communication modules that enable transfer of data from the payment card 200 to the POS terminal 104 over short ranges/distances. Examples of the communication module 818 include, Bluetooth 820, Wi-Fi 822, near field communication (NFC) 824, Universal Serial Bus (USB), etc.

As seen in FIG. 8, the payment card 200 is equipped with a counter 830. The counter 830 may be an IC provisioned within the payment card 200 and is configured to operatively communicate with other components, such as the processing system 814 and the storage 810 of the payment card 200. The counter 830 may be configured to count the input signal i.e., the fingerprint taps. The counter 830 further stores and displays the count of fingerprint taps provided by the customer 108 in the fingerprint sensor 804. It shall be noted that the counter 830 configured in the payment card 200 may be a digital counter or any other counters known in the art or later developed. It shall further be noted that the counter 830 may be a combination of digital counters, any other counters known in the art or later developed. In some embodiments, a register (not shown) may be configured into the payment card 200 instead of the counter 830.

Figure 9:
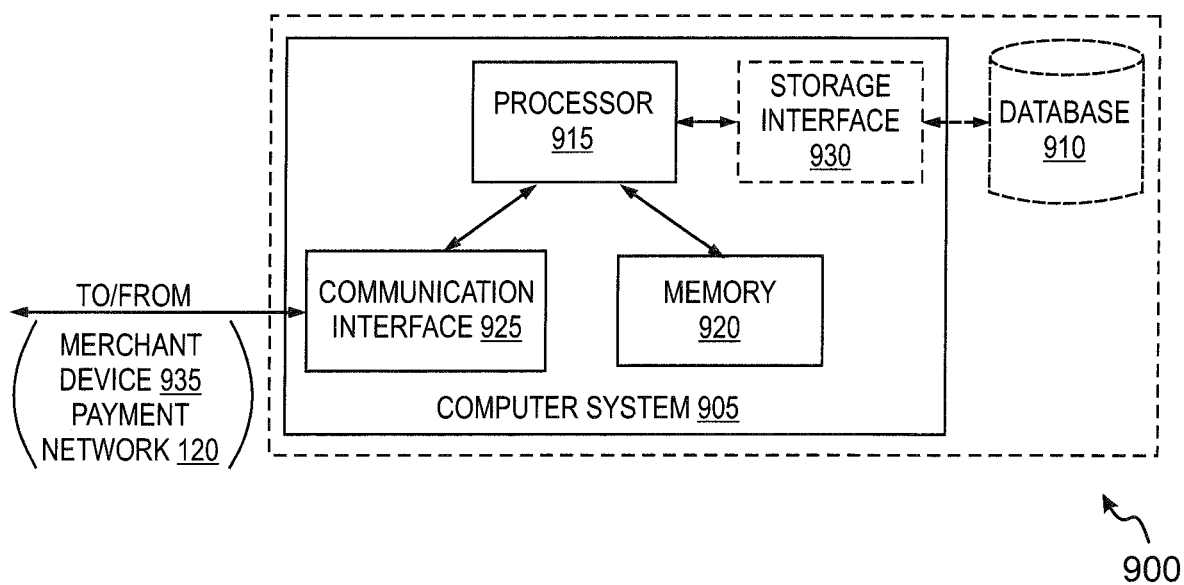
FIG. 9 is a simplified block diagram of the server system used for facilitating the payment transaction with the payment card of the customer, in accordance with one embodiment of the present disclosure.

FIG. 9 is a simplified block diagram of a server system 900 used for facilitating a payment transaction with a payment card, in accordance with one embodiment of the present disclosure. Examples of the server system 900 include, but are not limited to, the acquirer server 116, the payment server 118 and the issuer server 114 illustrated in FIG. 1. The server system 900 includes a computer system 905 and a database 910.

The computer system 905 includes at least one processor 915 for executing instructions. Instructions may be stored in, for example, but not limited to, a memory 920. The processor 915 may include one or more processing units (e.g., in a multi-core configuration).

The processor 915 is operatively coupled to a communication interface 925 such that the computer system 905 is capable of communicating with a remote device, such as a merchant device 935 (e.g., the POS terminal 104) or communicating with any entity within the payment network 120. For example, the communication interface 925 may receive the payment transaction request, where the payment transaction request is generated in response to the purchase of products by a customer and scanning of the products at a checkout counter by an agent.

The processor 915 may also be operatively coupled to the database 910. The database 910 is any computer-operated hardware suitable for storing and/or retrieving data, such as, but not limited to, transaction data generated as part of sales activities conducted over the bankcard network including data relating to merchants, account holders or customers, and purchases. The database 910 may also store information related to a plurality of user's issuer accounts. Each user account data includes at least one of a cardholder name, a cardholder address, an account number, MPIN, and other account identifier. The database 910 may also store information of a plurality of merchants, plurality of loyalty programs offered by the plurality of merchants, plurality of POS terminals installed at merchant facilities, such as POS ID, etc. The database 910 may also include instructions for settling transactions including merchant bank account information. The database 910 may include multiple storage units, such as hard disks and/or solid-state disks in a redundant array of inexpensive disks (RAID) configuration. The database 910 may include a storage area network (SAN) and/or a network attached storage (NAS) system.

In some embodiments, the database 910 is integrated within the computer system 905. For example, the computer system 905 may include one or more hard disk drives as the database 910. In other embodiments, the database 910 is external to the computer system 905 and may be accessed by the computer system 905 using a storage interface 930. The storage interface 930 is any component capable of providing the processor 915 with access to the database 910. The storage interface 930 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 915 with access to the database 910.

The processor 915 is configured to facilitate a payment transaction from an issuer account to an acquirer account (merchant account). The processor 915 is configured to one or more of the functions such as: verify the merchant, identify the customer transaction amount from the fingerprint tap input, verify or facilitate verification of fingerprint, determine if the merchant transaction amount conforms to the customer transaction amount, authenticate the customer 108, verify payment card details and check available standing balance in an issuer account of the customer 108, among others. The processor 915 is further configured to verify a PIN of the payment card. Thereafter, the processor 915 is configured to facilitate the payment transaction from the issuer account of the customer 108 to the acquirer account of the merchant. The processor 915 may also be configured to notify the POS terminal 104 and the merchant device 104 of the transaction status via the communication interface 925.

Figure 10:
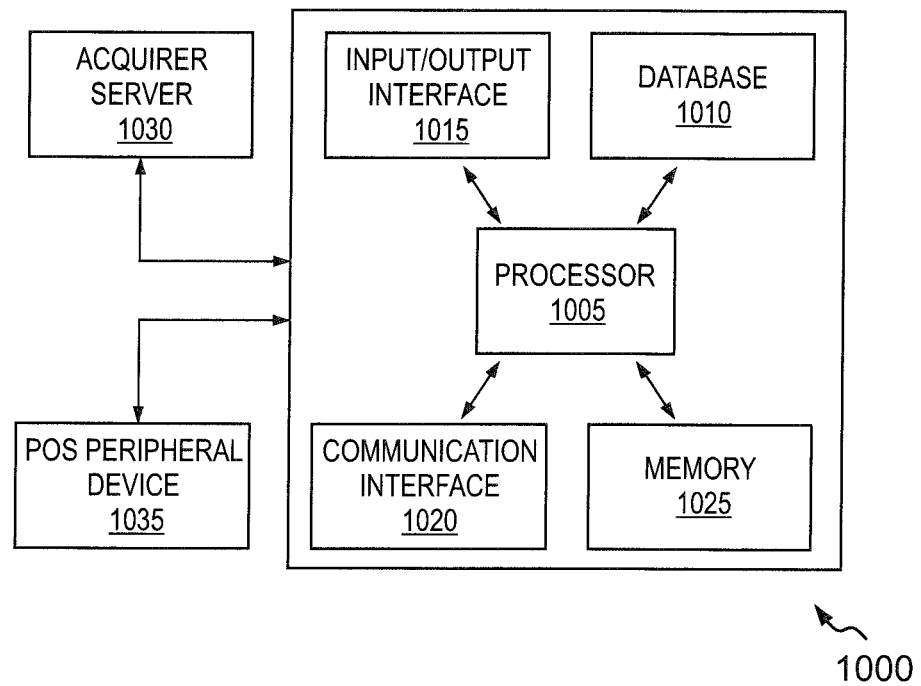
FIG. 10 is a simplified block diagram of a merchant terminal, or a POS terminal, used for payment transactions and facilitating the payment transaction with the payment card of the customer, in accordance with one embodiment of the present disclosure.

FIG. 10 is a simplified block diagram of a POS terminal 1000 used for payment transactions, in accordance with one embodiment of the present disclosure. The POS terminal 1000 as explained herein is only one example of the merchant interface device 104. In various embodiments, the merchant device 104 can be a merchant mobile phone, a kiosk, a PDA, a merchant facilitated e-commerce website interface running on a computing device and the like. The POS terminal 1000 includes at least one processor 1005 communicably coupled to a database 1010, an Input/Output (I/O) interface 1015, a communication interface 1020 and a memory 1025. The components of the POS terminal 1000 provided herein may not be exhaustive, and that the POS terminal 1000 may include more or fewer components than that of depicted in FIG. 10. Further, two or more components may be embodied in one single component, and/or one component may be configured using multiple sub-components to achieve the desired functionalities. Some components of the POS terminal 1000 may be configured using hardware elements, software elements, firmware elements and/or a combination thereof.

The I/O interface 1015 is configured to receive inputs from and provide outputs to the end-user (i.e., the merchant and/or the customer) of the POS terminal 1000. For instance, the I/O interface 1015 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a UI display (such as a light emitting diode display, a thin-film transistor (TFT) display, a liquid crystal display, an active-matrix organic light-emitting diode (AMOLED) display, etc.), a speaker, a ringer, a vibrator, and the like.

The memory 1025 can be any type of storage accessible to the processor 1005. For example, the memory 1025 may include volatile or non-volatile memories, or a combination thereof. In some non-limiting examples, the memory 1025 can be four to sixty-four MegaBytes (MB) of Dynamic Random Access Memory ("DRAM") or Static Random Access Memory ("SRAM"). In addition, some examples may include supplementary flash memory installed via a PCMCIA slot.

The database 1010 is capable of storing and/or retrieving data, such as, but not limited to, smart card insertions, user/customer information, merchant information, payment strings uniquely associated with each user, card swipes, touch-screen key depressions, keypad key depressions, number of dots printed by the slip and roll printers, check read errors, and the like. Such information can be accessed by the processor 1005 using the communication interface 1020 to determine potential future failures and the like.

The POS terminal 1000 is capable of communicating with one or more POS peripheral devices, such as a POS peripheral device 1035 and external server system, such as an acquirer server 1030 (an example of the acquirer server 116 of FIG. 1) via the communication interface 1020 over a communication network, such as the network 112 of FIG. 1. The POS peripheral device 1035 can provide functionality, which is used by a consumer at a merchant facility, such as PIN entry, merchant transaction amount entry, clear text entry, signature capture, and the like. Some non-exhaustive examples of the POS peripheral device 1035 include a POS card reader device (such as the POS card reader device 103) barcode scanner, cash drawer, receipt printer, PIN pad, fingerprint input module or fingerprint sensor, signature capture device, touchscreen, keyboard, portable data terminal, customer pole display, and the like. In some embodiments, the POS terminal 1000 may be mounted near a cash register at a check-out counter in merchant facility, while the POS peripheral device 1035 may be mounted on the check-out counter such that it is accessible to the users. In this way, both the merchant and the user/customer can interact with similar devices to process the payment transaction.

The communication interface 1020 is further configured to cause display of user interfaces on the POS terminal 1000. In one embodiment, the communication interface 1020 includes a transceiver for wirelessly communicating information to, or receiving information from, the acquirer server 1030 or other suitable display device, and/or another type of remote processing device. In another embodiment, the communication interface 1020 is capable of facilitating operative communication with the remote devices and a cloud server using Application Program Interface (API) calls. The communication may be achieved over a communication network, such as the network 112.

The processor 1005 is capable of sending the payment transaction request received from the end-user via the communication interface 1020 to the acquirer server 1030 for processing the payment transaction. For example, the processor 1005 is configured to receive the payment string and the transaction amount entered by the end-user using the UIs. The processor 1005 can access the database 1010 to retrieve the user information and merchant information that are required to be sent along with the payment transaction request to the acquirer server 1030.

Additionally, the POS terminal 1000 can include an operating system and various software applications that can provide various functionality to the POS terminal 1000. For example, in some embodiments, the POS terminal 1000 is addressable with an Internet protocol and includes a browser application. In such embodiments, the processor 1005 includes software adapted to support such functionality. In some embodiments, the processor 1005 executes software to support network management. In particular, this capacity allows software to be downloaded to a plurality of such systems to provide new applications, such as an application for enabling payment string based payment transactions using POS terminals and/or updates to existing applications. The operating system and software application upgrades are distributed and maintained through communication to the POS terminal 1000 over the communication network 112.

Figure 11:
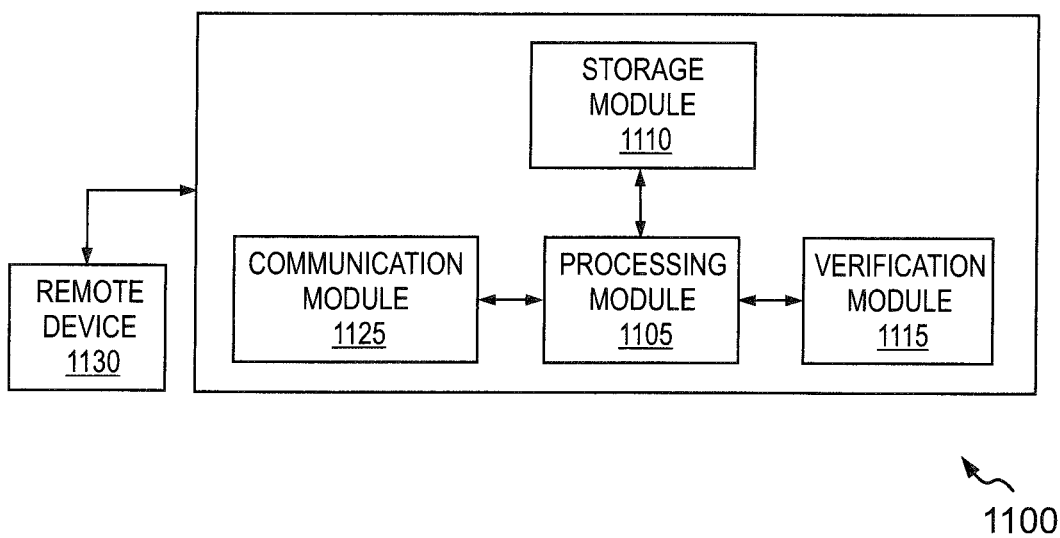
FIG. 11 is a simplified block diagram of an issuer server for facilitating the payment transaction with the payment card of the customer, in accordance with one embodiment of the present disclosure.

FIG. 11 is a simplified block diagram of an issuer server 1100, in accordance with one embodiment of the present disclosure. The issuer server 1100 is an example of the issuer server 114 of FIG. 1, or may be embodied in the issuer server 114. The issuer server 1100 is associated with an issuer bank/issuer, in which a customer may have an account, which provides a payment card. The issuer server 1100 includes a processing module 1105 operatively coupled to a storage module 1110, a verification module 1115 and a communication module 1125. The components of the issuer server 1100 provided herein may not be exhaustive and that the issuer server 1100 may include more or fewer components than that depicted in FIG. 11. Further, two or more components may be embodied in one single component, and/or one component may be configured using multiple sub-components to achieve the desired functionalities. Some components of the issuer server 1100 may be configured using hardware elements, software elements, firmware elements and/or a combination thereof.

The storage module 1110 is configured to store machine executable instructions to be accessed by the processing module 1105. Additionally, the storage module 1110 stores information related to contact information of the customer, bank account number, availability of funds in the account, payment card details, travel information of customers, and/or the like. This information is retrieved by the processing module 1105 for validation during machine-readable script generation.

The processing module 1105 is configured to communicate with one or more remote devices, such as a remote device 1130 using the communication module 1125 over a network, such as the payment network 120 of FIG. 1. The examples of the remote device 1130 include the POS terminal 104, the payment server 118, the acquirer server 116 and the central biometric server 130, or other computing systems of the issuer and the payment network 120, and the like. The communication module 1125 is capable of facilitating such operative communication with the remote devices and cloud servers using API (Application Program Interface) calls. The communication module 1125 is configured to receive the payment transaction request from the POS terminal 104 via the payment network 120. The communication module 1125 is configured to send notification of approval or decline of a transaction and the machine-readable script to the POS terminal 104 via the payment network 120.

The verification module 1115 is configured to verify and validate a customer (such as the customer 108), the payment card 106 associated with the customer and a PIN of the payment card for approving the payment transaction. The verification module 1115 may also verify if an issuer account of the customer associated with the payment card has a good standing balance.

Figure 12:
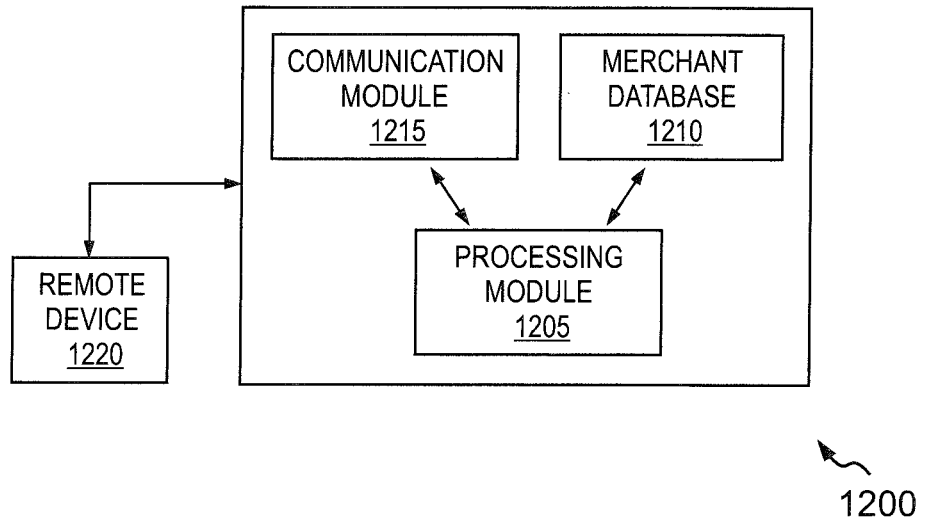
FIG. 12 is a simplified block diagram of an acquirer server used for facilitating the payment transaction with the payment card of the customer, in accordance with one embodiment of the present disclosure.

FIG. 12 is a simplified block diagram of an acquirer server 1200 used for facilitating provision of a customer transaction amount with purchase at a POS terminal using a payment card, in accordance with one embodiment of the present disclosure. The acquirer server 1200 is associated with an acquirer bank, which may be associated with a merchant at whose facility the customer 108 is purchasing items. The merchant may have established an account to accept payment for purchase of items from customers. The acquirer server 1200 is an example of the acquirer server 116 of FIG. 1 or may be embodied in the acquirer server 116. Further, the acquirer server 1200 is configured to facilitate payment transactions with the issuer server 1100 using a payment network, such as the payment network 120 of FIG. 1. The acquirer server 1200 includes a processing module 1205 communicably coupled to a merchant database 1210 and a communication module 1215. The components of the acquirer server 1200 provided herein may not be exhaustive, and that the acquirer server 1200 may include more or fewer components than that of depicted in FIG. 12. Further, two or more components may be embodied in one single component, and/or one component may be configured using multiple sub-components to achieve the desired functionalities. Some components of the acquirer server 1200 may be configured using hardware elements, software elements, firmware elements, and/or a combination thereof.

The merchant database 1210 includes a table which stores one or more merchant parameters, such as, but not limited to, a merchant primary account number (PAN), a merchant name, a merchant ID (MID), a merchant category code (MCC), a merchant city, a merchant postal code, an MAID, a merchant brand name, terminal identification numbers (TIDs) associated with merchant terminals (e.g., the POS terminals or any other merchant electronic devices) used for processing transactions, among others. The processing module 1205 is configured to use the MID or any other merchant parameter, such as the merchant PAN, to identify the merchant during the normal processing of payment transactions, adjustments, chargebacks, end-of-month fees, loyalty programs associated with the merchant, and so forth. The processing module 1205 may be configured to store and update the merchant parameters in the merchant database 1210 for later retrieval. In an embodiment, the communication module 1215 is capable of facilitating operative communication with a remote device 1220.

Figure 13:
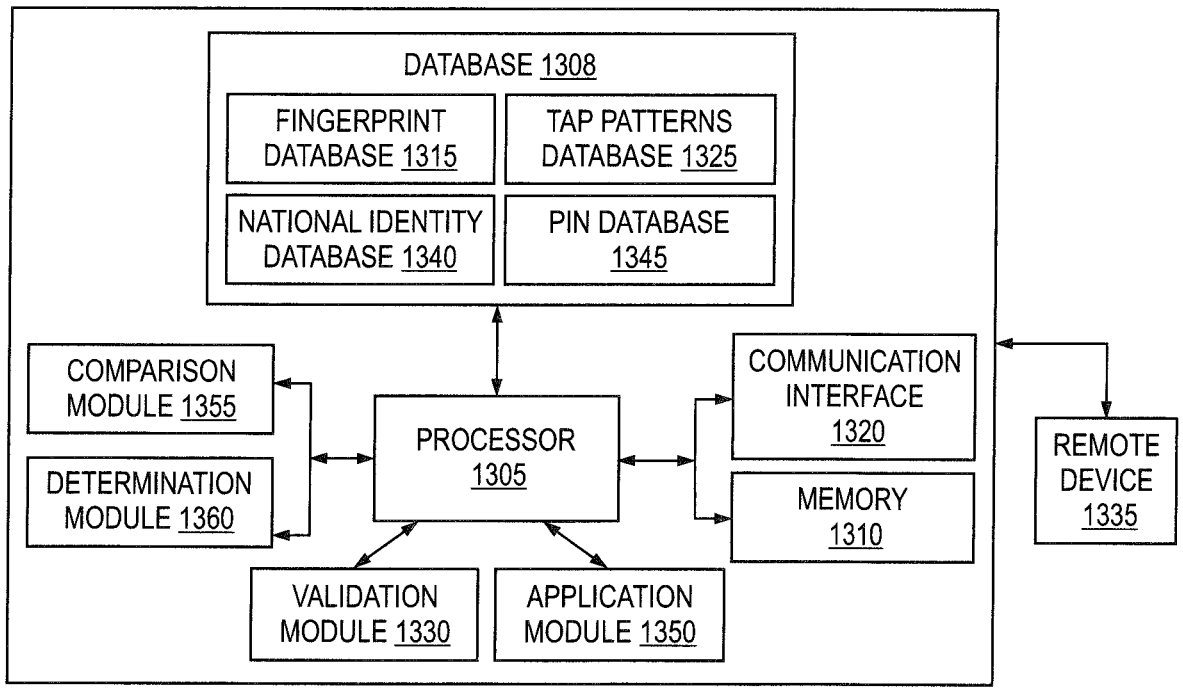
FIG. 13 is a simplified block diagram of a payment server used for facilitating the payment transaction with the payment card of the customer, in accordance with one embodiment of the present disclosure.

FIG. 13 is a simplified block diagram of a payment server 1300 used for facilitating provision of a customer transaction amount with purchase at a POS terminal using a payment card, in accordance with one embodiment of the present disclosure. The payment server 1300 may correspond to the payment server 118 of FIG. 1. The payment network 120 may be used by the payment server 1300, the issuer server 1100 and the acquirer server 1200 as a payment interchange network. Examples of a payment interchange network include, but not limited to, Mastercard® payment system interchange network. The payment server 1300 includes a processor 1305 configured to extract programming instructions from a memory 1310 to provide various features of the present disclosure. The components of the payment server 1300 provided herein may not be exhaustive and that the payment server 1300 may include more or fewer components than that depicted in FIG. 13. Further, two or more components may be embodied in one single component, and/or one component may be configured using multiple sub-components to achieve the desired functionalities. Some components of the payment server 1300 may be configured using hardware elements, software elements, firmware elements and/or a combination thereof.

Via a communication interface 1320, the processor 1305 receives the payment transaction request from a remote device 1335, such as the acquirer server 1200, or the POS terminal 1000. The communication may be achieved through API calls, without loss of generality. A plurality of databases, such as a fingerprint database 1315, a tap patterns database 1325, a national identity information database 1340 and a PIN database 1345 are embodied within a database 1308 of the payment server 1300. The fingerprint database 1315 stores fingerprint data of customers registered by customers through the web/mobile application facilitated by the application module 1350. The tap patterns database 1325 stores information on tap patterns/customized tap patterns associated with numbers and digits. The national identity information database 1340 may store national identity numbers of registered customers and the registered fingerprints of the customers are associated with the national identity numbers. The PIN database 1345 stores registered PINs associated with payment cards of customers. The fingerprint database 1315, the tap patterns database 1325, the national identity information database 1340 and the PIN database 1345 are in operative communication with a validation module 1330, a determination module 1360 and a comparison module 1355.

The comparison module 1355 receives instructions from the processor 1305 to compare fingerprints captured through a fingerprint input module (such as the fingerprint input module 202) with fingerprints stored in the fingerprints database 1315 and an associated national identity number stored in the national identity information database 1340. Upon occurrence of a match, the validation module 1330 validates or authenticates the identity of a customer. The determination module 1360 identifies a customer transaction amount based on information available in the tap patterns database 1325. The determination module 1360 determines whether a merchant transaction amount conforms with the customer transaction amount.

The memory 1310 stores details, such as Issuer ID, POS ID, country code, acquirer ID, payment card details, acquirer account information, transaction records, merchant account information, and the like. The customer details, the payment card details, the issuer account balance, etc., are validated using the validation module 1330. The validation module 1330 may include one or more predefined rule sets which the processor 1305 can process the validation. Further, the processor 1305, upon successful validation, sends transaction amounts and the merchant parameters to the acquirer server 1200 for crediting the merchant account with the transaction amount.

The processor 1305 is further configured to notify the remote device 1335 of the transaction status via the communication interface 1320. The remote devices, as an example, may be the merchant device 104, the POS card reader device 103 and the customer device 301. In one embodiment, the processor 1305 may facilitate a dedicated application capable of being installed on the merchant device 104. The merchant may be enabled to view the transaction status using the application on the merchant device 104. The merchant may access the application using a web link as well, instead of having a need to install the application on the merchant device 104.

Figure 14:
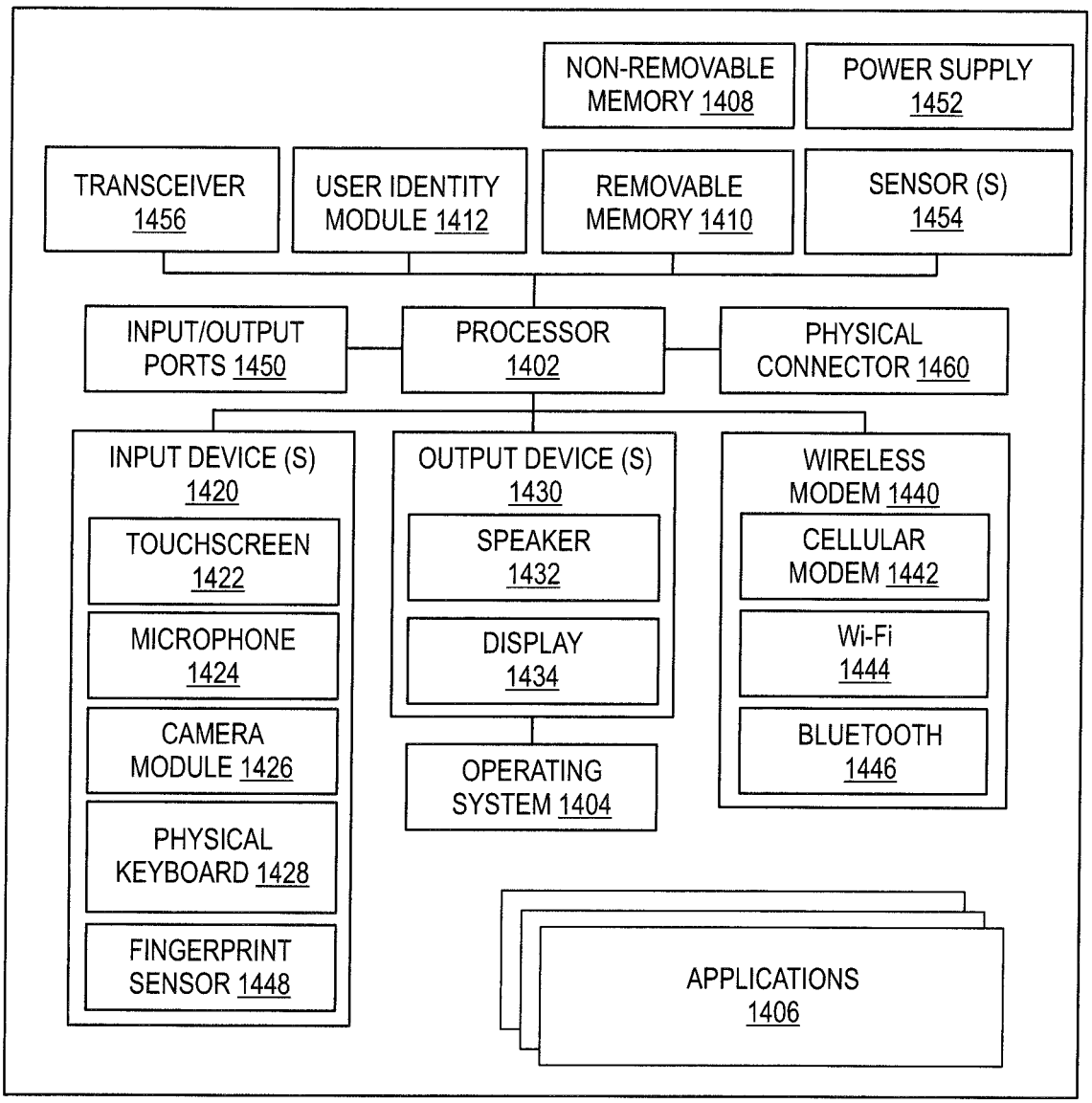
FIG. 14 shows a simplified block diagram of a user device, for example, a mobile phone capable of implementing at least some embodiments of the present disclosure.

FIG. 14 shows a simplified block diagram of a user device 1400, for example, a mobile phone or a desktop computer capable of implementing the various embodiments of the present disclosure. For example, the user device 1400 may correspond to the customer device 301 of FIG. 3. The user device 1400 is depicted to include one or more applications 1406.

It should be understood that the user device 1400, as illustrated and hereinafter described, is merely illustrative of one type of device and should not be taken to limit the scope of the embodiments. As such, it should be appreciated that at least some of the components described below in connection with that the user device 1400 may be optional and thus in an example embodiment may include more, less or different components than those described in connection with the example embodiment of FIG. 14. As such, among other examples, the user device 1400 could be any of an electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated user device 1400 includes a controller or a processor 1402 (e.g., a signal processor, microprocessor, ASIC, or other control and processing logic circuitry) for performing such tasks as signal coding, data processing, image processing, input/output processing, power control, and/or other functions. An operating system 1404 controls the allocation and usage of the components of the user device 1400 and support for one or more application programs, that implements one or more of the innovative features described herein. The applications 1406 may include a payment server application. Additionally, the applications 1406 may include common mobile computing applications (e.g., telephony applications, email applications, calendars, contact managers, web browsers, messaging applications such as USSD messaging or SMS messaging or SIM Tool Kit (STK) application) or any other computing application.

The illustrated user device 1400 includes one or more memory components, for example, a non-removable memory 1408 and/or a removable memory 1410. The non-removable memory 1408 and/or the removable memory 1410 may be collectively known as a database in an embodiment. The non-removable memory 1408 can include RAM, ROM, flash memory, a hard disk, or other well-known memory storage technologies. The removable memory 1410 can include flash memory, smart cards, or a Subscriber Identity Module (SIM). The one or more memory components can be used for storing data and/or code for running the operating system 1404 and the applications 1406. The user device 1400 may further include a user identity module (UIM) 1412. The UIM 1412 may be a memory device having a processor built in. The UIM 1412 may include, for example, a subscriber identity module (SIM), a universal integrated circuit card (UICC), a universal subscriber identity module (USIM), a removable user identity module (R-UIM), or any other smart card. The UIM 1412 typically stores information elements related to a mobile subscriber. The UIM 1412 in the form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The user device 1400 can support one or more input devices 1420 and one or more output devices 1430. Examples of the input devices 1420 may include, but are not limited to, a touch screen/a display screen 1422 (e.g., capable of capturing finger tap inputs, finger gesture inputs, multi-finger tap inputs, multi-finger gesture inputs, or keystroke inputs from a virtual keyboard or keypad), a microphone 1424 (e.g., capable of capturing voice input), a camera module 1426 (e.g., capable of capturing still picture images and/or video images), a physical keyboard 1428 and a fingerprint sensor 1448. Examples of the output devices 1430 may include, but are not limited to a speaker 1432 and a display 1434. Other possible output devices can include piezoelectric or other haptic output devices. Some devices can serve more than one input/output function. For example, the touch screen 1422 and the display 1434 can be combined into a single input/output device.

A wireless modem 1440 can be coupled to one or more antennas (not shown in the FIG. 17) and can support two-way communications between the processor 1402 and external devices, as is well understood in the art. The wireless modem 1440 is shown generically and can include, for example, a cellular modem 1442 for communicating at long range with the mobile communication network, a Wi-Fi compatible modem 1444 for communicating at short range with an external Bluetooth-equipped device or a local wireless data network or router, and/or a Bluetooth-compatible modem 1446. The wireless modem 1440 is typically configured for communication with one or more cellular networks, such as a GSM network for data and voice communications within a single cellular network, between cellular networks, or between the user device 1400 and a public switched telephone network (PSTN).

The user device 1400 can further include one or more input/output ports 1450 for establishing connection with peripheral devices including the POS terminal 1000, a power supply 1452, one or more sensors 1454, for example, an accelerometer, a gyroscope, a compass, or an infrared proximity sensor for detecting the orientation or motion of the user device 1400 and biometric sensors for scanning biometric identity of an authorized user, a transceiver 1456 (for wirelessly transmitting analog or digital signals) and/or a physical connector 1460, which can be a USB port, IEEE 1294 (FireWire) port, and/or RS-232 port. The illustrated components are not required or all-inclusive, as any of the components shown can be deleted and other components can be added.

Without in any way limiting the scope, interpretation, or application of the claims appearing below, a technical effect of one or more of the example embodiments disclosed herein is to provide computer implemented methods and server systems for facilitating an online transaction with a payment card of a customer carried out over the Internet by authenticating an identity of the customer. The system provides a server system and a payment card comprising a fingerprint input module. Fingerprint tap inputs provided through the fingerprint input module are verified by performing a comparison of the received fingerprints against already stored fingerprints present at the server system or a biometric server. The server system further enables checking if a transaction amount entered by a merchant at the POS terminal conforms to a transaction amount indicated by a fingerprint tap input. The server system ensures that a transaction request will only be processed if the fingerprints are successfully verified and if the transaction amount entered by a merchant at the POS terminal conforms to the transaction amount indicated by a fingerprint tap input. By implementing such additional steps for authenticating the identity of the customer and checking that the merchant has entered a correct transaction amount, threats associated with theft of payment cards and merchant related frauds can be mitigated.

The disclosed methods with reference to FIGS. 1 to 14, or one or more operations of the flow diagrams 600 and 700, may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the disclosure has been described with reference to specific exemplary embodiments, it is noted that various modifications and changes may be made to these embodiments without departing from the broad spirit and scope of the disclosure. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server system 900 (e.g., servers 114, 116 and 118) and its various components, such as the computer system 905 and the database 910, may be enabled using software and/or using transistors, logic gates, and electrical circuits (for example, integrated circuit circuitry such as ASIC circuitry). Various embodiments of the disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media includes any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the disclosure, as discussed above, may be practiced with steps and/or operations in a different order, and/or with hardware elements in configurations, which are different than those which are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

With that said, and as described, it should be appreciated that one or more aspects of the present disclosure transform a general-purpose computing device into a special-purpose computing device (or computer) when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, the terminology used herein is for the purpose of describing particular exemplary embodiments only and is not intended to be limiting. As used herein, the singular forms "a," "an," and "the" may be intended to include the plural forms as well, unless the context clearly indicates otherwise. And, again, the terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the term "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

It is also noted that none of the elements recited in the claims herein are intended to be a means-plus-function element within the meaning of 35 U.S.C. § 112(f) unless an element is expressly recited using the phrase "means for," or in the case of a method claim using the phrases "operation for" or "step for."

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of facilitating a payment transaction with a payment card of a customer, the method comprising:

capturing, by a fingerprint input module of a payment card capable of sensing fingerprints, a fingerprint tap input provided by a customer, the fingerprint tap input including: (i) a fingerprint tap pattern indicative of a customer transaction amount associated with a purchase by the customer at a merchant terminal and (ii) a fingerprint of the customer;

transmitting, by a processor of the payment card to the merchant terminal, via a communication module of the payment card, the fingerprint tap input obtained from the fingerprint input module of the payment card, based on the payment card being swiped at or inserted into the merchant terminal;

receiving, by a server system associated with a payment network, a payment transaction request for the purchase initiated at the merchant terminal, the payment transaction request including:

a merchant transaction amount associated with the purchase entered at the merchant terminal; and the fingerprint tap input provided by the customer on the fingerprint input module of the payment card;

facilitating, by the server system, verification of the fingerprint obtained from the fingerprint tap input of the customer by comparing the received fingerprint of the fingerprint tap input with a stored fingerprint of the customer in a database associated with the server system;

upon successful verification, determining the customer transaction amount from the fingerprint tap pattern of the fingerprint tap input and determining whether the merchant transaction amount conforms to the customer transaction amount; and facilitating a payment transaction for the purchase associated with the payment transaction request with an issuer server, in response to the merchant transaction amount conforming to the customer transaction amount.

2. The method as claimed in claim 1, further comprising facilitating registration of fingerprints, a national identity number of the customer and a PIN of the payment card of the customer through an application associated with the server system.

3. The method as claimed in claim 2, wherein facilitating registration further comprises:
   storing the registered fingerprints, the national identity number and the PIN in the database associated with the server system, the registered fingerprints including the stored fingerprint; and
   linking the registered fingerprints and the national identity number with stored fingerprints and a stored national identity number, respectively, present in a central biometric server.

4. The method as claimed in claim 2, wherein facilitating registration of fingerprints further comprises:
   assigning user defined fingerprint tap patterns to digits and numbers; and
   storing the user defined fingerprint tap patterns in the server system.

5. The method as claimed in claim 1, wherein facilitating verification of the received fingerprint further comprises:
   identifying the fingerprint obtained from the fingerprint tap input as a registered fingerprint;
   extracting an associated national identity number from a database associated with the server system upon identification of the received fingerprint; and
   facilitating comparison of the fingerprint obtained from the fingerprint tap input and the associated national identity number with the stored fingerprint and stored associated national identity number, respectively.

6. The method as claimed in claim 5, wherein facilitating comparison further comprises:
   sending the fingerprint obtained from the fingerprint tap input and the associated national identity number to a central biometric server for comparison; and
   receiving verification information of the fingerprint obtained from the fingerprint tap input and the associated national identity number from the central biometric server.

7. The method as claimed in claim 1, wherein determining whether the merchant transaction amount conforms to the customer transaction amount further comprises determining if the merchant transaction amount is less than or equal to the customer transaction amount, wherein the customer transaction amount represents a pre-defined maximum debit limit to be debited from an issuer account of the customer for a current transaction.

8. The method as claimed in claim 1, wherein facilitating the payment transaction further comprises sending the payment transaction request to the issuer server for approval of the payment transaction.

9. A server system for facilitating a payment transaction with a payment card of a customer, the server system comprising:
   a memory comprising stored instructions; and
   at least one processor in communication with the memory, the at least one processor configured to execute the stored instructions to cause the server system to:
   receive a payment transaction request initiated at a merchant terminal, the payment transaction request including:
      a merchant transaction amount associated with a purchase entered at the merchant terminal; and
      a fingerprint tap input provided by the customer on a fingerprint input module of a payment card, the fingerprint input module capable of sensing fingerprints of the customer, the fingerprint tap input including (i) a fingerprint tap pattern indicative of a customer transaction amount associated with the purchase and (ii) a fingerprint of the customer;
   facilitate verification of the fingerprint of the customer included in the fingerprint tap input based on a comparison of said fingerprint with a stored fingerprint of the customer;
   upon successful verification, determine the customer transaction amount from the fingerprint tap pattern of the fingerprint tap input and determine whether the merchant transaction amount conforms to the customer transaction amount; and
   facilitate a payment transaction associated with the payment transaction request with an issuer server in response to the merchant transaction amount conforming to the customer transaction amount.

10. The server system as claimed in claim 9, wherein the stored instructions, when executed by the at least one processor, further cause the server system to facilitate an application to enable registration of fingerprints, a national identity number and a PIN of the payment card of the customer at the server system.

11. The server system as claimed in claim 10, wherein the stored instructions, when executed by the at least one processor in connection with facilitating registration of the fingerprints, the national identity number, and the PIN of the payment card, cause the server system to:
   store the registered fingerprints, the national identity number of the customer and the PIN of the payment card of the customer in a database associated with the server system; and
   link the registered fingerprints and the national identity number with stored fingerprints and a stored national identity number, respectively, present in a central biometric server.

12. The server system as claimed in claim 10, wherein the stored instructions, when executed by the at least one processor in connection with facilitating registration of the fingerprints, the national identity number, and the PIN of the payment card, cause the server system to:
   define fingerprint tap patterns and assign the fingerprint tap patterns to digits and numbers; and
   store the fingerprint tap patterns in a database associated with the server system.

13. The server system as claimed in claim 9, wherein the stored instructions, when executed by the at least one processor in connection with facilitating verification of the received fingerprint, cause the server system to:
   identify the fingerprint obtained from the fingerprint tap input as a registered fingerprint;
   extract an associated national identity number from a database associated with the server system upon identification of the received fingerprint; and
   facilitate comparison of the fingerprint obtained from the fingerprint tap input and the associated national identity number with the stored fingerprint and stored associated national identity number, respectively.

14. The server system as claimed in claim 13, wherein the stored instructions, when executed by the at least one processor in connection with facilitating the comparison, cause the server system to:
   send the fingerprint obtained from the fingerprint tap input and the associated national identity number to a central biometric server for comparison; and
   receive verification information of the fingerprint obtained from the fingerprint tap input and the associated national identity number from the central biometric server based on the comparison.

15. The server system as claimed in claim 9, wherein the stored instructions, when executed by the at least one processor in connection with determining whether the merchant transaction amount conforms to the customer transaction amount, cause the server system to determine if the merchant transaction amount is less than or equal to the customer transaction amount, wherein the customer transaction amount represents a pre-defined maximum debit limit to be debited from an issuer account of the customer for a current transaction.

16. The server system as claimed in claim 9, wherein the stored instructions, when executed by the at least one processor in connection with facilitating the payment transaction, cause the server system to send the payment transaction request to the issuer server for approval of the payment transaction.

17. A payment card, comprising:
   a fingerprint input module configured to provision a fingerprint tap input, the fingerprint tap input indicative of a customer transaction amount associated with a purchase;
   a storage system configured to store instructions and the fingerprint tap input; and
   a processing system configured to execute the instructions to:
      store the fingerprint tap input in the storage system; and
      transfer the fingerprint tap input to a merchant terminal when the payment card is in communication with the merchant terminal.

18. The payment card of claim 17, wherein the payment card further comprises a power supply to power the fingerprint input module.

19. The payment card of claim 17, wherein the payment card further comprises:
   a wireless communication module configured to transfer information from the storage system to the merchant terminal; and
   a counter configured to count fingerprint taps from the fingerprint tap input provided by a customer.

* * * * *